United States Patent
Gulati et al.

(10) Patent No.: US 10,447,596 B2
(45) Date of Patent: *Oct. 15, 2019

(54) CONGESTION CONTROL FOR LTE-V2V

(71) Applicant: QUALCOMM Incorporated, San Diego, CA (US)

(72) Inventors: Kapil Gulati, Dover, DE (US); Gaurav Gupta, Los Angeles, CA (US); Shailesh Patil, Raritan, NJ (US); Marco Papaleo, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 102 days.

This patent is subject to a terminal disclaimer.

(21) Appl. No.: 15/585,772

(22) Filed: May 3, 2017

(65) Prior Publication Data
US 2018/0048577 A1 Feb. 15, 2018

Related U.S. Application Data

(60) Provisional application No. 62/372,756, filed on Aug. 9, 2016.

(51) Int. Cl.
*H04W 28/02* (2009.01)
*H04L 12/801* (2013.01)
(Continued)

(52) U.S. Cl.
CPC .............. *H04L 47/12* (2013.01); *H04L 43/12* (2013.01); *H04L 47/11* (2013.01); *H04L 47/24* (2013.01);
(Continued)

(58) Field of Classification Search
CPC .... H04W 72/10; H04W 84/042; H04L 47/24; H04L 12/852
See application file for complete search history.

(56) References Cited

U.S. PATENT DOCUMENTS

2007/0115915 A1* 5/2007 Sheng ................... H04W 72/10
370/350
2011/0110257 A1* 5/2011 Kim ..................... H04W 52/146
370/252
(Continued)

OTHER PUBLICATIONS

Ericsson: "Adaptation of MCS, RB Allocation, and Number of Retransmissions", 3GPP Draft; R1-165244, vol. RAN WG1, No. Nanjing; May 14, 2016, XP051089808, Retrieved from the Internet: URL:http://www.3gpp.org/ftp/tsg_ran/WG1_RL1/TSGR1_85/Docs/ [retrieved on May 14, 2016], 3 pages.
(Continued)

*Primary Examiner* — Wei Zhao
(74) *Attorney, Agent, or Firm* — Arent Fox LLP

(57) ABSTRACT

Improvements may be made for the congestion control considering different technologies, types of radio resources, and priorities of different packets. The apparatus may be a UE. The UE determines a channel busy ratio (CBR). The UE determines one or more channel resource utilization limits based on the CBR, wherein each channel resource utilization limit of the one or more channel resource utilization limits corresponds to a respective packet priority. The UE controls transmission of a plurality of packets based on the one or more channel resource utilization limits, each packet of the plurality of packets being associated with a respective packet priority.

30 Claims, 11 Drawing Sheets

(51) Int. Cl.
| | |
|---|---|
| H04L 12/26 | (2006.01) |
| H04W 24/06 | (2009.01) |
| H04W 52/34 | (2009.01) |
| H04W 52/36 | (2009.01) |
| H04L 12/851 | (2013.01) |
| H04W 72/10 | (2009.01) |
| H04W 84/04 | (2009.01) |
| H04W 76/14 | (2018.01) |

(52) U.S. Cl.
CPC ....... *H04W 24/06* (2013.01); *H04W 28/0236* (2013.01); *H04W 52/346* (2013.01); *H04W 52/362* (2013.01); *H04W 72/10* (2013.01); *H04W 28/0268* (2013.01); *H04W 28/0284* (2013.01); *H04W 76/14* (2018.02); *H04W 84/042* (2013.01); *Y02D 70/00* (2018.01); *Y02D 70/10* (2018.01); *Y02D 70/12* (2018.01); *Y02D 70/126* (2018.01); *Y02D 70/1242* (2018.01); *Y02D 70/1262* (2018.01); *Y02D 70/14* (2018.01); *Y02D 70/142* (2018.01); *Y02D 70/144* (2018.01); *Y02D 70/162* (2018.01); *Y02D 70/20* (2018.01); *Y02D 70/21* (2018.01); *Y02D 70/26* (2018.01)

(56) References Cited

U.S. PATENT DOCUMENTS

| | | | |
|---|---|---|---|
| 2011/0235599 A1 | 9/2011 | Nam et al. | |
| 2015/0156662 A1 | 6/2015 | Bai et al. | |
| 2016/0242054 A1* | 8/2016 | Lee | H04B 17/345 |
| 2018/0048572 A1 | 2/2018 | Gulati et al. | |

OTHER PUBLICATIONS

Ericsson: "Congestion Control in V2X Sidelink", 3GPP Draft, R2-164106, vol. RAN WG2, No. Nanjing, China; May 22, 2016, XP051105423, Retrieved from the Internet: URL:http://www.3gpp.org/ftp/Meetings_3GPP_SYNC/RAN2/Docs/ [retrieved on May 22, 2016], 7 pages.

Ericsson: "Radio Measurements for Congestion Control for V2X," 3GPP Draft; R1-165268, 3rd Generation Partnership Project Mobile Competence Centre; 650, Route Des Lucioles; F-06921 Sophia-Antipolis Cedex, vol. RAN WG1, No. Nanjing; May 23, 2016-May 27, 2016, May 14, 2016, 4 pages, XP051089794, Retrieved from the Internet: URL:http://www.3gpp.org/ftp/tsg_ran/WG1_RL1/TSGR1_85/Docs/ [retrieved on May 14, 2016].

Ericsson: "Radio Measurements for Congestion Control for V2X," 3GPP Draft; R4-164248, 3rd Generation Partnership Project (3GPP), Mobile Competence Centre; 650, Route Des Lucioles; F-06921 Sophia-Antipolis Cedex; France, vol. RAN WG4, No. Nanjing, May 23, 2016-May 27, 2016, May 13, 2016, 3 pages, XP051089403, and Retrieved from the Internet: URL:http://www.3gpp.org/ftp/tsg_ran/WG4_Radio/TSGR4_79/Docs/ [retrieved on May 13, 2016].

"Intelligent Transport Systems (ITS); Cross Layer DCC Management Entity for Operation in the ITS G5A and ITS G5B Medium; Draft ETSI TS 103 175", ETSI, 650, Route Des Lucioles; F-06921 Sophia-Antipolis ; France, vol. ITS—ITSWG2, No. V1.0.2, Jun. 5, 2015, pp. 1-35, XP014242715 [retrieved on Jun. 5, 2015].

"Intelligent Transport Systems (ITS); Cross Layer DCC Management Entity for Operation in the ITS G5A and ITS G5B Medium; Report on Cross layer DCC Algorithms and Performance Evaluation; Draft ETSI TR 101 612", vol. ITS—ITSWG2, No. V1.0.11, Sep. 2, 2014, pp. 1-57, XP014188657 [retrieved on Sep. 2, 2014].

"Intelligent Transport Systems (ITS) Radiocommunications Equipment Operating in the 5 855 MHz to 5 925 MHz Frequency Band; Harmonised Standard Covering the Essential Requirements of Article 3.2 of Directive 2014/53/EU", Harmonised European Standard, vol. ERM TG37, No. V2.0.0, Mar. 1, 2016, XP014273956, 45 pages.

International Search Report and Written Opinion—PCT/US2017/041392—ISA/EPO—dated Oct. 6, 2017.

Qualcomm Incorporated: "Congestion Control in V2X", 3GPP Draft; R2-166744, vol. RAN WG2, No. Kaohsuing; Sep. 30, 2016, XP051161906, Retrieved from the Internet: URL:http://www.3gpp.org/ftp/tsg_ran/WG2_RL2/TSGR2_95bis/Docs/ [retrieved on Sep. 30, 2016], 13 pages.

Qualcomm Incorporated: "Congestion control for V2V", R1-1611594, 3GPP TSG-RAN WG1 #87, Nov. 14-18, 2016, Reno, USA, 13 pages.

Qualcomm Incorporated: "Congestion control for V2V", R1-1702526, 3GPP TSG-RAN WG1 #88, Feb. 13-17, 2017, Athens, Greece, 8 pages.

* cited by examiner

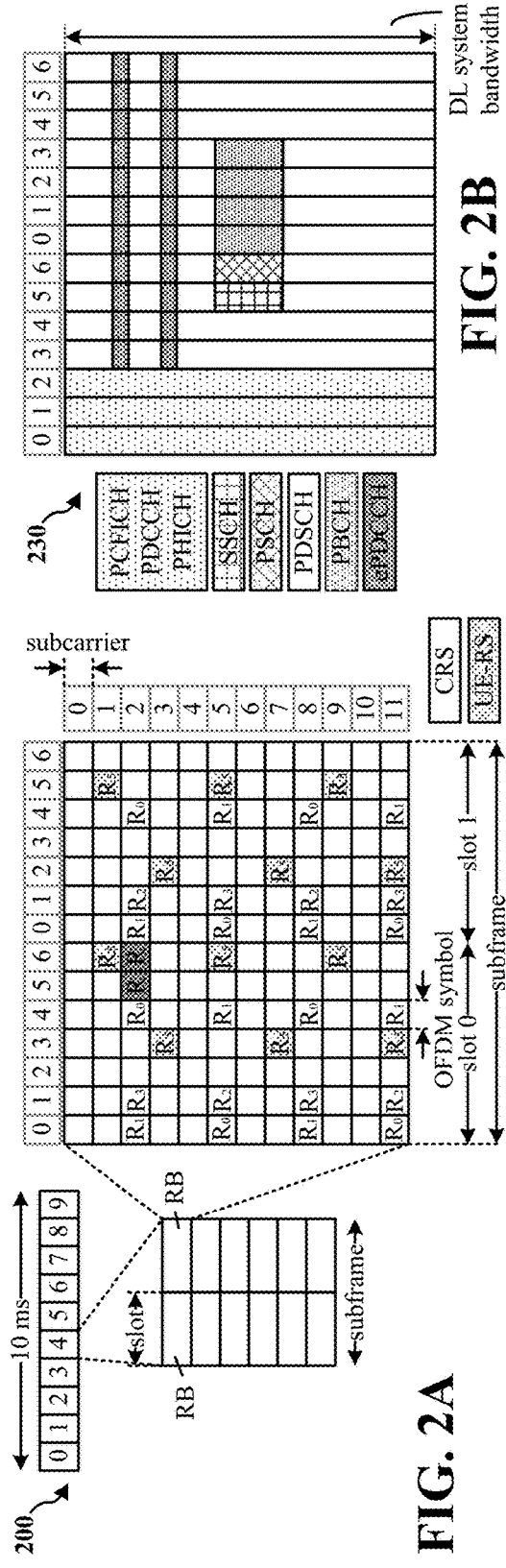
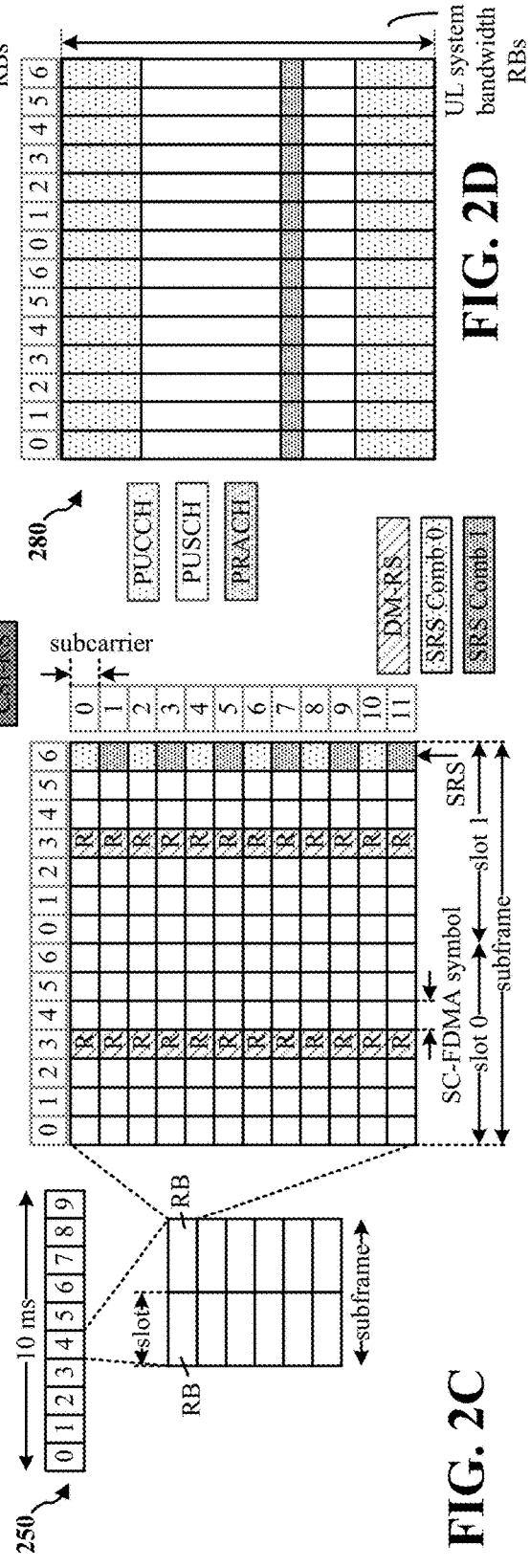
FIG. 2A
FIG. 2B
FIG. 2C
FIG. 2D

CONGESTION CONTROL FOR LTE-V2V

CROSS-REFERENCE TO RELATED APPLICATION(S)

This application claims the benefit of U.S. Provisional Application Ser. No. 62/372,756, entitled "CONGESTION CONTROL FOR LTE-V2V" and filed on Aug. 9, 2016, which is expressly incorporated by reference herein in its entirety.

BACKGROUND

Field

The present disclosure relates generally to communication systems, and more particularly, to congestion control in device-to-device communication.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Congestion may occur in device-to-device communication such as vehicle-to-vehicle communication. The congestion control to improve communication experience has been implemented. The congestion control may be performed in a decentralized manner, based on a channel busy ratio. Various improvements may be made for the congestion control considering different technologies that a user equipment (UE) is using, types of radio resources, and priorities of different packets.

In an aspect of the disclosure, a method, a computer-readable medium, and an apparatus are provided. The apparatus may be a UE. The UE determines a channel busy ratio (CBR). The UE determines one or more channel resource utilization limits based on the CBR, wherein each channel resource utilization limit of the one or more channel resource utilization limits corresponds to a respective packet priority. The UE controls transmission of a plurality of packets based on the one or more channel resource utilization limits, each packet of the plurality of packets being associated with a respective packet priority.

In an aspect, the apparatus may be a UE. The UE may include means for determining a CBR. The UE may include means for determining one or more channel resource utilization limits based on the CBR, wherein each channel resource utilization limit of the one or more channel resource utilization limits corresponds to a respective packet priority. The UE may include means for controlling transmission of a plurality of packets based on the one or more channel resource utilization limits, each packet of the plurality of packets being associated with a respective packet priority.

In an aspect, the apparatus may be a UE including a memory and at least one processor coupled to the memory. The at least one processor is configured to: determine a CBR, determine one or more channel resource utilization limits based on the CBR, wherein each channel resource utilization limit of the one or more channel resource utilization limits corresponds to a respective packet priority, and control transmission of a plurality of packets based on the one or more channel resource utilization limits, each packet of the plurality of packets being associated with a respective packet priority.

In an aspect, a computer-readable medium storing computer executable code may include code to: determine a CBR, determine one or more channel resource utilization limits based on the CBR, wherein each channel resource utilization limit of the one or more channel resource utilization limits corresponds to a respective packet priority, and control transmission of a plurality of packets based on the one or more channel resource utilization limits, each packet of the plurality of packets being associated with a respective packet priority.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

DETAILED DESCRIPTION

Figure 1:
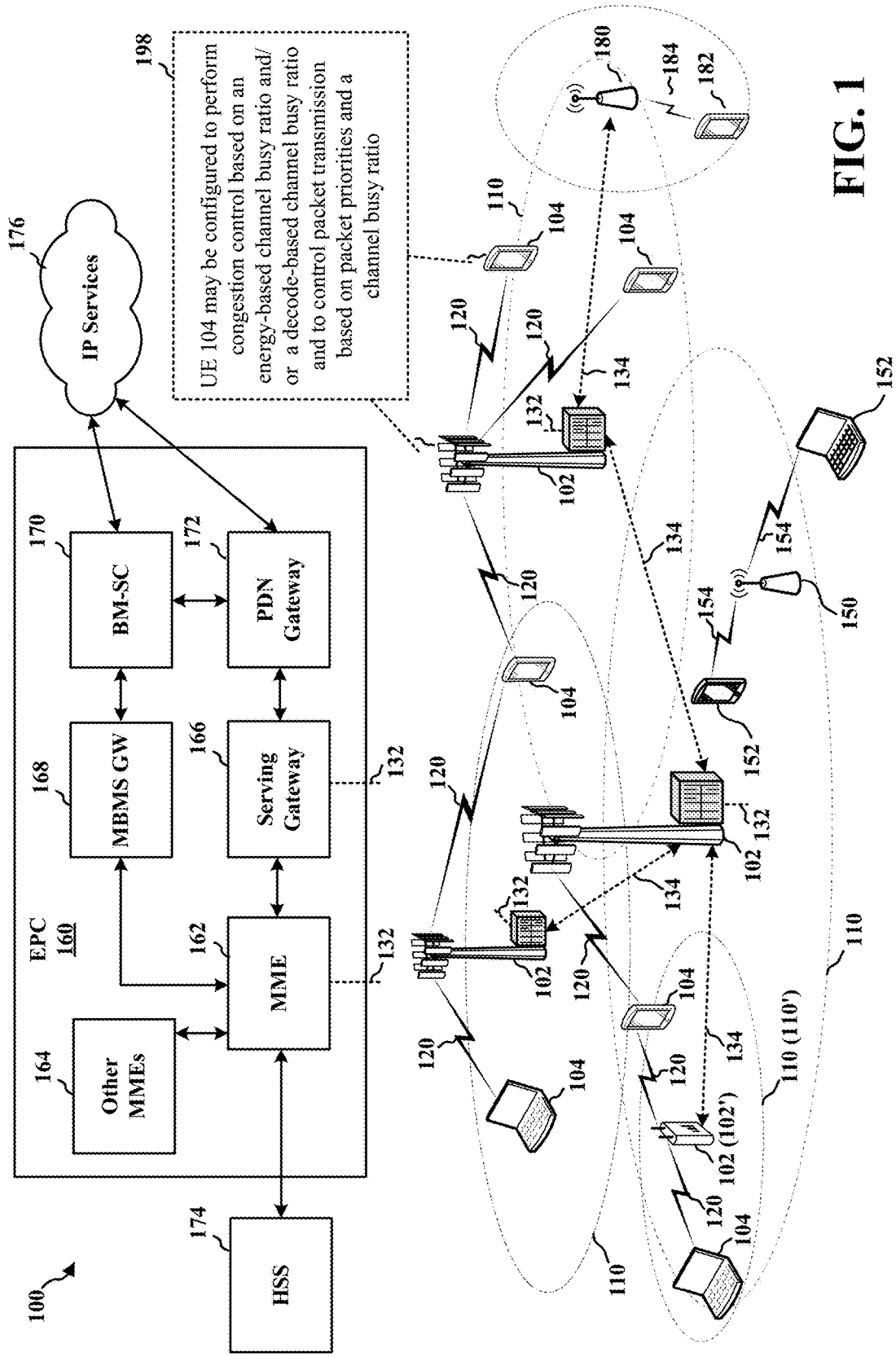
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies in communication with the UE 182. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to perform congestion control based on an energy-based channel busy ratio and/or a decode-based channel busy ratio and to control packet transmission based on packet priorities and a channel busy ratio (198).

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
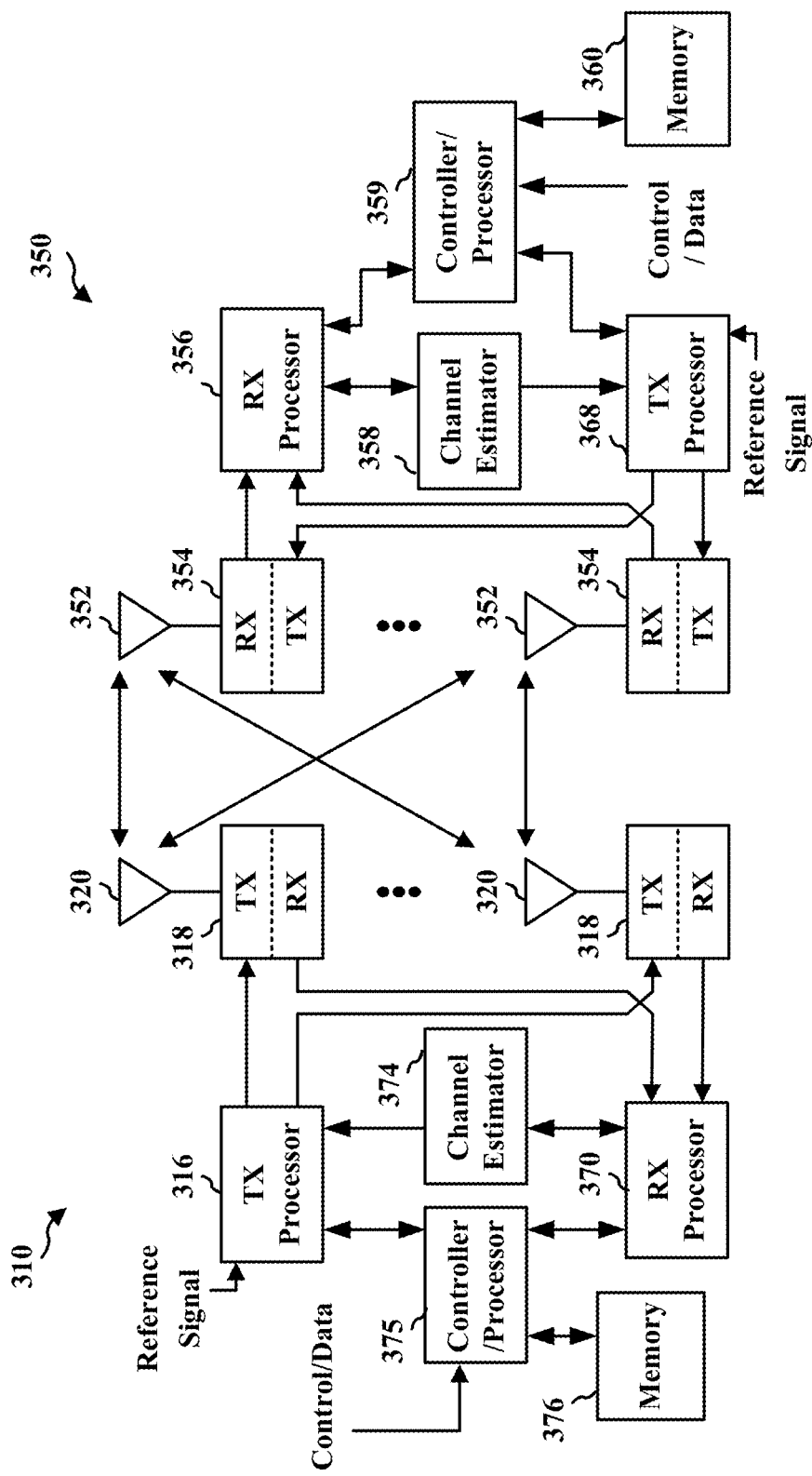
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
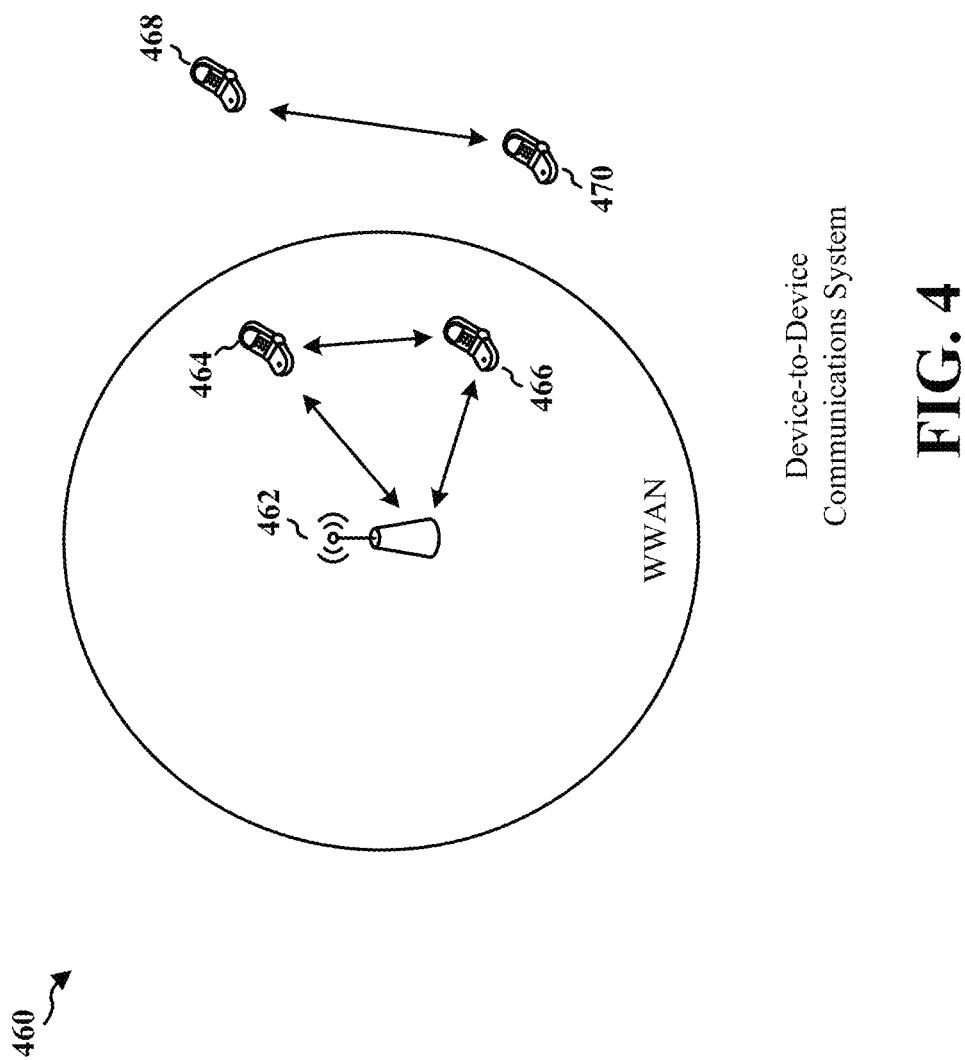
FIG. 4 is a diagram of a device-to-device communications system.

FIG. 4 is a diagram of a device-to-device (D2D) communications system 460. The D2D communications system 460 includes a plurality of UEs 464, 466, 468, 470. The D2D communications system 460 may overlap with a cellular communications system, such as for example, a WWAN. Some of the UEs 464, 466, 468, 470 may communicate together in D2D communication using the DL/UL WWAN spectrum, some may communicate with the base station 462, and some may do both. For example, as shown in FIG. 4, the UEs 468, 470 are in D2D communication and the UEs 464, 466 are in D2D communication. The UEs 464, 466 are also communicating with the base station 462. The D2D communication may be through one or more sidelink channels, such as a physical sidelink broadcast channel (PSBCH), a physical sidelink discovery channel (PSDCH), a physical sidelink shared channel (PSSCH), and a physical sidelink control channel (PSCCH).

The exemplary methods and apparatuses discussed infra are applicable to any of a variety of wireless D2D communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

D2D communication may be used to provide direct communication between devices. D2D communication enables one device to communicate with another device and transmit data to the other device over allocated resources. One use for the D2D communication is a vehicle-to-vehicle (V2V) communication and vehicle-to-everything (V2X) communication. Thus, according to the V2V communication, a first vehicle's device may perform D2D communication with another vehicle's device. According to the V2X communication, a vehicle's device may perform D2D communication with another device, regardless of whether that the device resides in a vehicle or not.

One type of communication that may be used for V2V communication is dedicated short range communication (DSRC). The DSRC provides a short-range wireless communication capability, typically based on IEEE 802.11p that is similar to Wifi. In the DSRC, before transmission, a device may examine a channel. For transportation-related communications (e.g., V2X communication), 5.9 GHz unlicensed spectrum is generally reserved to communicate intelligent transportation services (ITS). Recently, implementing other types of communication such as LTE communication for V2V communication have been under development. For example, LTE direct (LTE-D) may be utilized for V2V communication, over a licensed spectrum and/or an unlicensed spectrum.

Figure 5:
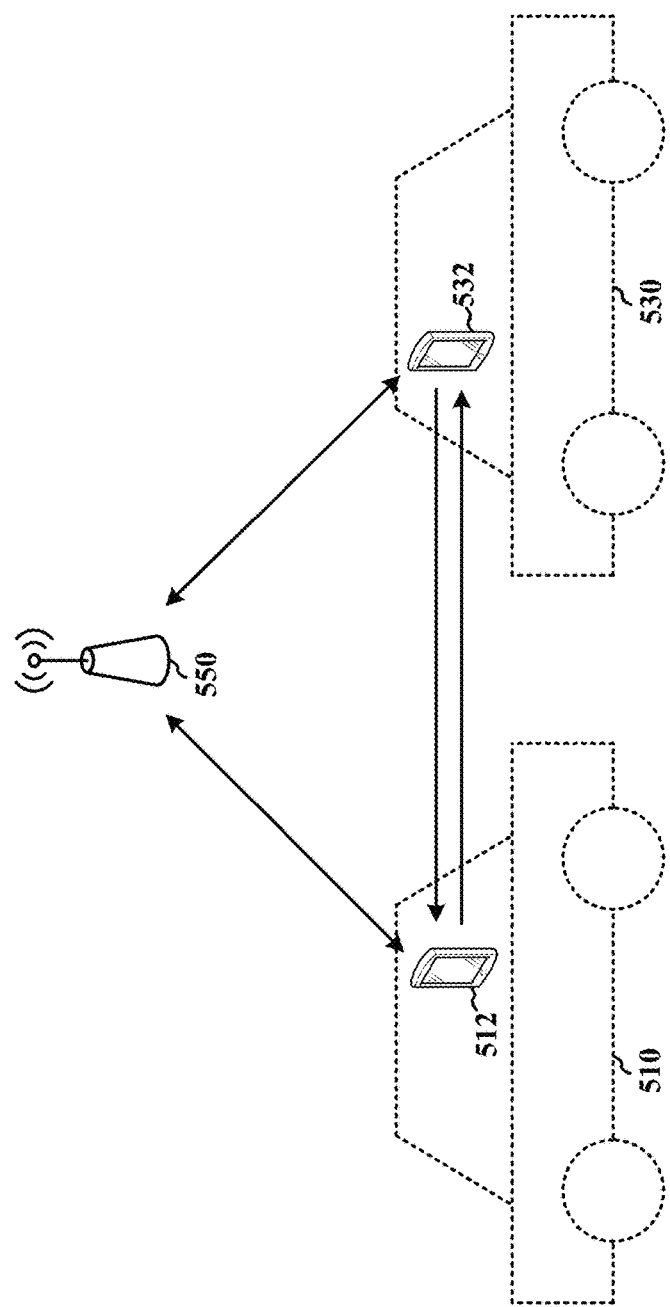
FIG. 5 is an example diagram illustrating device-to-device communication.

FIG. 5 is an example diagram 500 illustrating device-to-device communication. A first device 512 (e.g., UE 512) is present in a first vehicle 510, and thus may travel with the first vehicle 510. A second device 532 (e.g., another UE 532) may be present in a second vehicle 530. In another aspect, the first device 512 may be present independently from the first vehicle 510 or may be a part of the first vehicle 510. The second device 532 may be present independently from the second vehicle 530, or may be a part of the second vehicle 530. The first device 512 and the second device 532 may be connected (e.g., in connected mode with the base station) to a base station 550. The first device 512 and the second device 532 may also be configured to perform D2D communication with each other over LTE. The first device 512 and the second device 532 may also perform short range communication with each other over IEEE 802.11p.

LTE V2V communication may provide more reliable performance than IEEE 802.11p by providing synchronization in transmission, by using frequency-division modulation (FDM), and by providing a coding gain. Although the following discussion refers to LTE V2V communication by way of illustration and not limitation, the LTE V2V communication is similar to LTE D2D communication, and thus following discussion may also apply to LTE D2D communication.

Congestion may occur in LTE V2V communication, e.g., due to increased network traffic. Congestion control may be implemented to control network congestion via certain parameters related to communication over LTE V2V based on a level of the congestion. For example, in certain instances, there may be no centralized entity to perform congestion control of the spectrum usage. The congestion control may be performed without a centralized entity (e.g. eNB) to manage admission control and/or radio resource utilization (e.g. out-of-network coverage operation, and/or decentralized resource selection/reselection procedures). Without a centralized entity managing network resources and device communications, collisions of different communications may occur. Too many collisions may adversely affect the performance of the communication system. For example, collisions may occur when resources are not properly allocated to different device communications which may result in some devices not having sufficient resources for communication. Depending on the communication system and/or the channel access method of the communication system, a device may not be able to function effectively due to network congestion. For example, a number of communications that can be successfully performed reliably in a network may vary depending on a type of a communication system. Decentralized congestion control may be based on an 802.11p physical layer and may be generalized to provide coexistence of various technologies. Therefore, technology-neutral decentralized congestion control in a system with no centralized entity for managing congestion may be desirable. In some aspects, technology specific enhancements for decentralized congestion control may be provided.

In an aspect, congestion control may be based on a channel busy ratio (CBR) and/or a channel resource utilization. The CBR may represent a percentage of busy resources. The channel resource utilization may represent a percentage of a channel resource being utilized for communication. The CBR and the channel resource utilization may be technology-neutral, as described below. Decentralized congestion control for the 802.11p technology may be derived based on the technology-neutral congestion control. The technology-neutral approach for decentralized congestion control may be used for LTE-V2V.

Each UE in the network may estimate a channel resource utilization based on a CBR. The CBR may be an estimate of the percentage of the resources that are deemed busy/utilized. In an aspect, a resource may be deemed busy and/or utilized if a signal is decoded on such a resource or if the energy in such a resource is greater than an energy threshold. The CBR may be estimated by dividing a number of probes that found busy resources by a number of total probes on the resources, according to the following equation:

$$CBR_{est} = \frac{\Sigma 1V \text{ probe with resource busy}}{Np}$$

where:
1V probe with resource busy is the indicator function for a probe that found the resource busy.
Np is the total number of probes used to probe resources for resource-busy measurements.
The granularity of resources may be defined by Nt and Nf, where Nt is the time granularity of resource utilization (e.g. a 1 ms TTI for LTE, an OFDM symbol duration for 802.11p), and Nf is the frequency granularity of resource utilization (e.g. channel BW for 802.11p, 180 kHz for LTE). In an aspect, the UE may probe resources based on the granularity of the resources, where each probe is used to probe one granularity of the resources.

For example, if the UE probes every 10 microseconds, probing for 100 msec would yield a total number of probes equal to 10000. If there are a total of 10000 probes used to probe for busy resources, and 8000 probes found the corresponding resources probed busy, then the CBR of the system may be 80%.

The CBR may be a function of the number of stations $N_{Sta}$ (e.g., a number of UEs, a number of transmitters) within certain proximity (e.g., within a communication range of the UE):

$$CBR = f(N_{sta}),$$

where the function $f(N_{sta})$ may be technology dependent and may depend on a channel access procedure of a corresponding technology.

In an aspect, congestion control may be performed by limiting the channel resource utilization per UE if the estimated CBR exceeds a CBR limit ($CBR_{limit}$). The channel resource utilization per UE may be expressed as a channel resource (CR). A CR limit (e.g., per UE or per station) may be determined by dividing a total resources that the system can utilize (e.g., $CBR_{limit}$) by a number of stations (e.g., UEs) $N_{Sta}$, which can be expressed as:

$$CR_{limit} = \frac{CBR_{limit}}{N_{Sta}} = \frac{CBR_{limit}}{f^{-1}(CBR)}$$

In an alternate formulation, since the congestion control may be activated when the estimated CBR exceeds a CBR limit ($CBR_{limit}$), the CR limit (e.g., per UE or STA) may be determined as:

$$CR_{limit} = \frac{CBR}{N_{Sta}} = \frac{CBR}{f^{-1}(CBR)}$$

In one approach, CBR may be estimated using a linear function of $N_{Sta}$, which may be expressed as $CBR = a*N_{sta} + b$. For technology coexistence with 802.11p, the parameters may be $1/a = 4000$ and $b = 0.62$ (target CBR limit). Additionally, the CR for 802.11p may be estimated as $T_{on}/(T_{on}+T_{off})$ due to TDMA access (when a device transmits on the entire channel bandwidth and there is no FDMA operation), where $T_{on}$ is a duration of time when the UE is on and $T_{off}$ is a duration of time when the UE is off. $CR_{limit}$ may be estimated as $T_{on}/(T_{on}+T_{off\_limit})$, where $T_{off\_limit}$ is the minimum time that the UE may be off to maintain the channel resource utilization to be less than the CR limit.

Using the above approach for 802.11p, the following equations may be derived.

$$\frac{1}{CR_{limit}} = 1 + \frac{T_{off\_limit}}{T_{on}} = \frac{\frac{CBR-b}{a}}{CBR}$$

$$\Rightarrow T_{off\_limit} = T_{on} \times \left(\frac{1}{a}\frac{CBR-b}{CBR} - 1\right)$$

Thus, a CR for 802.11p may be $T_{on}$ divided by the total time: $CR=T_{on}/(T_{on}+T_{off})$. For example, if the UE is on 400 msec and off for 100 msec, then the CR is 400/(400+100)=4/5. In an aspect, if the UE is on longer, the UE should be off longer. Further, as shown above, $T_{off}$ or $T_{off\_limit}$ may be a linear function of $T_{on}$, which depends on the CBR. Thus, if the channel is busy and thus the CBR is high, the UE may back off more on transmissions due to a greater $T_{off}$ or a greater $T_{off\_limit}$.

The above congestion control approach may have the following limitations when used in a system with multiple technologies sharing the network resources. First, the CBR and channel resource utilization (e.g., a CR) definitions may be applicable only to TDMA systems, where $CR=T_{on}/(T_{on}+T_{off})$. Second, a UE estimating the CBR of the system may treat all radio resources equally, which may cause a problem for LTE V2V. In particular, for LTE V2V, the total radio resources may be split into control resources and data resources. When separate resources are used for control and data, control resources may become congested while the overall resources may not be congested (e.g., due to the data resources being free and not congested). In such an example, treating all resources equally when there are different types of resources may not effectively address the congestion of certain types of resources in the system. Thus, in an aspect, a CBR for control resources and a CBR for data resources separately is utilized. For example, by considering a CBR for control resources and a CBR for data resources separately, if the control resources are too congested, the system may consider the congestion of the control resources even if the data resources are available. Similarly, by considering a CBR for control resources and a CBR for data resources separately, if the data resources are too congested, the system may consider the congestion of the data resources even if the control resources are available.

Third, as discussed above, the UE may determine that a resource is busy if a signal is decoded on the resource and/or the energy measured on the resource is greater than a threshold. However, such determination of a busy resource by the UE may not consider coexistence of multiple technologies on the same channel. Thus, a congestion control approach for coexistence of multiple technologies in addressing the network congestion is desired. For example, according to an aspect of the disclosure, to enable coexistence, each technology of the multiple technologies may not be allowed to utilize more than 40% of the total resources for a total channel resource utilization of 80%.

Fourth, use of a single threshold for the CBR independent of priorities of transmissions may not allow the UE to prioritize transmission of higher priority packets than transmission of lower priority packets. Thus, different congestion limits for packets with different priorities may be beneficial. In an aspect, packet transmission based on the priorities of the packets may be performed for congestion control. For example, according to an aspect of the disclosure, if channel resource utilization is over a certain threshold (e.g., 50%), the UE may not transmit low priority packets, but may transmit high priority packets, which may provide more resources for transmitting higher priority packets.

According to an aspect of the disclosure, a CBR may be defined based on a percentage of radio resources that are busy/utilized during a measurement window. The UE may perform congestion control based on the CBR. In an aspect the CBR may be based on an energy-based CBR ($CBR_e$). The UE may compute the $CBR_e$ based on energy measurement on a resource. In particular, when computing the $CBR_e$, the UE may take energy measurements using probes of a set of resources, where each probe measures an energy on a respective resource of the set of resources, and may determine a percentage of busy resources based on the energy measurements. The UE may determine that a resource is busy if energy measured on the resource by a probe is greater than an energy threshold (e.g., resource energy $S>S_{th}$). Thus, in an aspect, the UE may compute the $CBR_e$ by dividing a number of probes whose energy measurements are greater than the energy threshold by a total number of probes ($N_p$).

In an aspect, the CBR may be based on a decode-based CBR ($CBR_d$). The UE may compute the $CBR_d$ based on decoding of a signal on a resource. In particular, when computing the $CBR_d$, the UE may determine whether a signal on each resource of a set of resources is decoded, where each of probes corresponds to a respective resource of the set of resources, and may determine a percentage of busy resources based on whether a signal on each resource of the set of resources is decoded. The UE may determine that a resource is busy if a signal on the resource is decoded. Thus, in an aspect, the UE may compute the $CBR_d$ by dividing a number of probes on resources on which signals are decoded by a total number of probes ($N_p$) (e.g., on all resources). In an aspect, the UE may determine that the signal on the resource is decoded if a cyclic redundancy check (CRC) passes. For example, the UE may determine that a successful decode occurs when a CRC computed by the UE matches the CRC in the signal on the resource.

The $CBR_e$ and the $CBR_d$ may be expressed as follows:

$$CBR_e = \frac{\Sigma 1V \text{ probes with resource energy } (S) > S_{th}}{Np}$$

$$CBR_d = \frac{\Sigma 1V \text{ probes with resource decode success } (CRC \text{ pass})}{Np}$$

According to a an aspect of the disclosure, for systems with separate control resources and data resources, where the control resources are used for control transmissions and the data resources are used for data transmissions, the UE may compute the CBR for control resources and the CBR for data resources separately. For example, the UE may compute two types of energy-based CBR including an energy-based CBR for control resources $CBR_{control\_e}$ and an energy-based CBR for data resources $CBR_{data\_e}$. For example, the UE may compute two types of decode-based CBRs including a decode-based CBR for control resources $CBR_{control\_d}$ and a decode-based CBR for data resources $CBR_{data\_d}$. The two types of energy-based CBRs and the two types of decode-based CBRs may be expressed as follows:

$$CBR_{control\_e} = \frac{\Sigma 1V \text{ probes with control resource energy} > S_{th}}{Np}$$

$$CBR_{control\_d} = \frac{\Sigma 1V \text{ probes with control resource decode success}}{Np}$$

$$CBR_{data\_e} = \frac{\Sigma 1V \text{ probes with data resource energy} > S_{th}}{Np}$$

$$CBR_{data\_d} = \frac{\Sigma 1V \text{ probes with data resource decode success}}{Np}$$

According to an aspect of the disclosure, the upper limit for the CBR (e.g., $CBR_e$, $CBR_d$, $CBR_{contrl\_e}$, $CBR_{control\_d}$, $CBR_{data\_e}$, $CBR_{data\_d}$) may be configured for the UE. In an aspect, the upper limit for each type of CBR (e.g., $CBR_{limit}$) may be provided via pre-configuration and/or a dynamic configuration. In an aspect, the pre-configuration may be performed via at least one of the UE or a universal integrated circuit card (UICC). For example, according to the pre-configuration approach, the upper limit (e.g., $CBR_{limit}$) may be preconfigured within the UE. In an aspect, the dynamic configuration is performed based on at least one of RRC signaling from a base station, signaling from an intelligent transportation system (ITS) server, or signaling from an operator-controlled server. For example, according to the dynamic configuration approach, a base station may provide the upper limit (e.g., via an RRC message) to the UE.

According to an aspect of the disclosure, the UE may compute the CR upper limit ($CR_{limit}$) on the channel resource utilization by dividing the $CBR_{limit}$ by a number of stations (e.g., UEs, transmitters) present within a communication range of the UE (e.g., the distance or angular range that can be reached by the UE). In an aspect, the $CR_{limit}$ defined by the CR (e.g., in terms of percentage of radio resources) may be computed as follows:

$$CR_{limit} = \frac{CBR_{limit}}{f^{-1}(CBR)}$$

where $f^{-1}(CBR) = N_{Sta}$ and $N_{Sta}$ is a number of stations, such that the inverse function $f^{-1}$ may determine a number of stations (e.g., UEs, transmitters) based on the CBR.

The inverse function $f^{-1}$ may be configured, e.g., via a pre-configuration within the UE or a dynamic configuration. In an aspect, the pre-configuration may be performed via at least one of the UE or a UICC. For example, according to the pre-configuration approach, the inverse function $f^{-1}$ may be preconfigured within the UE. In an aspect, the dynamic configuration is performed based on at least one of RRC signaling from a base station, signaling from an ITS sever, or signaling from an operator-controlled server. For example, according to the dynamic configuration approach, a base station may provide the inverse function $f^{-1}$ (e.g., via an RRC message) to the UE. In an aspect, the function f may be a fixed function (e.g., linear or exponential) or may be dynamically configured in the UE. Based on the CBR limit, the UE may compute the $CR_{limit}$ in terms of the percentage of radio resources that the UE is allowed to occupy, where the $CR_{limit}$ may represent the maximum allowed channel resource utilization. Thus, for example, the UE may be allowed to utilize channel resources given that the channel resource utilization by the UE is below the $CR_{limit}$.

The function, $$CR_{limit} = \frac{CBR_{limit}}{f^{-1}(CBR)},$$

may be generalized to $CR_{limit} = F(CBR)$, such that the $CR_{limit}$ may be expressed as a function of the CBR. In an aspect, the CBR may be an energy-based CBR. In an aspect, the generalized function F(CBR) may be configured, e.g., via a pre-configuration within the UE or a dynamic configuration. In an aspect, the pre-configuration may be performed via at least one of the UE or a UICC. For example, according to the pre-configuration approach, the generalized function F(CBR) may be preconfigured within the UE. In an aspect, the dynamic configuration is performed based on at least one of RRC signaling from a base station, signaling from an ITS sever, or signaling from an operator-controlled server. For example, according to the dynamic configuration approach, a base station may provide the generalized function F(CBR) (e.g., via an RRC message) to the UE. In an aspect, the generalized function F(CBR) may be configured for a particular packet priority.

In an aspect, the $CR_{limit}$ may be determined based on either the energy-based CBR or the decode-based CBR, depending on whether the UE detects another technology different from the technology of the UE. In particular, the UE may determine the $CR_{limit}$ based on the decode-based CBR if the UE determines another technology is detected. Thus, if another technology is detected, the UE may determine the $CR_{limit}$ by dividing $CBR_{limit\_d}$ ($CBR_{limit}$ for $CBR_d$) by a number of stations that is determined based on $CBR_d$. The UE may determine the $CR_{limit}$ based on the energy-based CBR if the UE determines another technology is not detected. Thus, if another technology is not detected, the UE may determine the $CR_{limit}$ by dividing $CBR_{limit\_e}$ ($CBR_{limit}$ for $CBR_e$) by a number of stations that is determined based on $CBR_e$. Therefore, for example, the CR limit may be determined as follows:

$$\text{If } \frac{\left(\sum_{iP=0}^{MW/Tp} 1_{(Ed > f*Ec)} 1_{(Ec > Th)}\right)}{\sum_{iP=0}^{MW/Tp} 1_{(Ec > Th)}} < Th_2 (\text{e.g. } 0.75),$$

$$\text{Then: } CR_{limit} = \frac{CBR_{limit\_d}}{f^{-1}(CBR_d)},$$

$$\text{Else: } CR_{limit} = \frac{CBR_{limit\_e}}{f^{-1}(CBR_e)}.$$

In the above example, the UE may detect another technology by considering energy instances where energy (Ec) on the resources is greater than a threshold (Th) and decode instances where a signal can be decoded (Ed) for the resources with energy (Ec) greater than a threshold (Th). If the ratio of the decode instances to the energy instances falls below a technology threshold ($Th_2$), then the UE may determine that another technology is present and may use the $CBR_{limit\_d}$ for coexistence among multiple technologies to compute $CR_{limit}$. If the ratio of the decode instances to the energy instances does not fall below the technology threshold ($Th_2$), then the UE may determine that another technology is not present and thus uses the $CBR_{limit\_e}$ to compute the $CR_{limit}$. In an aspect, the UE may ensure that $CBR_{limit\_d}$ is less than or equal to $CBR_{limit\_e}$. $f^{-1}(CBR_d)$ may be a number of stations (e.g., UEs, transmitters) utilizing the same technology as the UE computing the $CR_{limit}$ because the UE may not be able to decode signals of a different technology. On the other hand, $f^{-1}(CBR_e)$ may be a number of stations (e.g., UEs, transmitters) utilizing any technology because the UE considers energy on the resource which may include energy caused by the UE's technology as well as energy caused by other technologies. In an aspect, if no co-channel coexistence among different technologies is expected, then $CBR_{limit\_d}$ may not be configured and CR limits may be given by $CBR_{limit\_e}$.

According to an aspect of the disclosure, the UE may perform congestion control based on at least one of the CBRs described above (e.g., $CBR_e$, $CBR_d$, $CBR_{control\_e}$, $CBR_{control\_d}$, $CBR_{data\_e}$, $CBR_{data\_d}$). To perform congestion control based on the CBR (e.g., $CBR_e$, $CBR_d$, $CBR_{control\_e}$, $CBR_{control\_d}$, $CBR_{data\_e}$, $CBR_{data\_d}$), the UE may adjust transmission parameters (e.g., a number of occupied resources, MCS, a transmission rate, a number of HARQ retransmissions, etc.) and/or transmission power of the UE. In an aspect, if the CBR (e.g., $CBR_e$, $CBR_d$, $CBR_{control\_e}$, $CBR_{control\_d}$, $CBR_{data\_e}$, $CBR_{data\_d}$) exceeds the CBR limit, the UE may perform the congestion control by limiting the CR value. In an aspect, the UE may adjust the transmission parameters and/or the transmission power of the UE to maintain the CR value to be below the $CR_{limit}$. In an aspect, the UE may decrease the CR by increasing an MCS. For example, if the $CR_{limit}$ indicates 10% of total resources and the current CR is greater than 10%, then the UE may increase the MCS to increase the coding rate such that fewer resources may be used to transmit the same amount of data, to decrease the CR to 10%. In an aspect, if the UE performs multiple transmissions, the UE may adjust the number of transmissions to adjust the CR, where decreasing the number of transmissions may decrease the CR. In an aspect, the UE may decrease the CR by increasing the periodicity duration between transmissions to decrease a transmission rate (e.g., to address congestion) and/or by decreasing the number of HARQ retransmissions. The transmission rate is a rate at which the UE performs transmission. For example, the UE may decrease the transmission rate to transmit every 200 msec instead of every 100 msec, to reduce congestion. In an aspect, the UE may perform the congestion control features described above after determining the $CR_{limit}$.

According to an aspect of the disclosure, the $CBR_{limit}$ may vary depending on a packet priority of a packet, and thus the UE may control transmission of packets by considering packet priorities. In an aspect, the UE may compute the channel resource utilization limit ($CR_{limit}$) according to a priority of a packet being transmitted. In an aspect, the UE may control transmission of packets based on CBR limits that correspond to respective packet priorities, where a higher $CBR_{limit}$ may be used for a higher priority packet. For example, if a system supports packets of three priorities (p=0, 1, 2), with p=0 being the highest priority, the UE may determine different $CBR_{limit}$ values for each of the different priorities. In particular, the UE may determine $CBR_{limit\_p0}$ for p=0, $CBR_{limit\_p1}$ for p=1, $CBR_{limit\_p2}$ for p=2, where $CBR_{limit\_p2}<CBR_{limit\_p1}<CBR_{limit\_p0}$. In one example, $CBR_{limit\_p2}$ may be 30%, $CBR_{limit\_p1}$ may be 50%, and $CBR_{limit\_p0}$ may be 80%. In the example where $CBR_{limit\_p2}$=30%, if the CBR increases to over 30%, the UE may refrain from transmitting packets with priority 2 (p=2). In an aspect, for example, this aspect of the disclosure may ensure that lower priority traffic may congest the system up to a low threshold (e.g. 30%) while still allowing higher priority traffic to be successfully transmitted by allowing the higher priority traffic to congest the resources up to a high threshold (e.g., 80%).

According to one aspect, the UE may control transmission of packets based on CR limits that correspond to respective packet priorities, where a higher CR limit may be used for a higher priority packet. In an aspect, in a connected system with N number of UEs, a $CR_{limit}$ for a particular priority may be $CBR_{limit}$ for the particular priority divided by N, where N is a number of stations (e.g., UEs, transmitters, etc.) within a communication range of the UE. Thus, if a system supports packets of different priorities, the UE may determine different $CBR_{limit}$ values for each of the different priorities. For example, in a scenario where a system supports packets of three different priorities (p=0, 1, 2) with p=0 being the highest priority, in order to determine $CR_{limit\_p0}$ for p=0, $CR_{limit\_p1}$ for p=1, and $CR_{limit\_p2}$ for p=2 (where $CBR_{limit\_p2}<CBR_{limit\_p1}<CBR_{limit\_p0}$), the UE may determine $CR_{limit\_p0}=CBR_{limit\_p0}/N$, $CR_{limit\_p1}=CBR_{limit\_p1}/N$, and $CR_{limit\_p2}=CBR_{limit\_p2}/N$, respectively. In one example, $CBR_{limit\_p2}$ may be 30%, $CBR_{limit\_p1}$ may be 50%, and $CBR_{limit\_p2}$ may be 80%, and thus $CR_{limit\_p2}$ may be 0.3/N, $CR_{limit\_p1}$ may be 0.5/N, and $CR_{limit\_p0}$ may be 0.8/N. When transmitting a packet with p=0, a packet with p=1, and a packet with p=2, the UE should ensure that the CR for the packet with p=2 is less than $CR_{limit\_p2}$, the CR for the packet with p=1 is less than $CR_{limit\_p1}+CR_{limit\_p2}$, and the CR for the packet with p=0 is less than $CR_{limit\_p0}+CR_{limit\_p1}+CR_{limit\_p2}$. Therefore, for a higher priority packet, a higher CR may be allowed for UE's transmission of the higher priority packets.

In an aspect, the UE may compute channel resource utilization limits according to respective packet priorities of packets being transmitted. As discussed above, the function, $$CR_{limit} = \frac{CBR_{limit}}{f^{-1}(CBR)},$$

may be generalized to $CR_{limit}=F(CBR)$, and the generalized function F(CBR) may be configured for a particular packet priority. Thus, each channel resource utilization limit corresponding to a respective packet priority may be computed based on the CBR, based on the generalized function F(CBR) configured for the respective packet priority. For example, in a scenario where a system supports packets of three different priorities (p=0, 1, 2) with p=0 being the highest priority, channel resource utilizations for the three different priorities may be expressed as $CR_{limit\_p0}=F_0(CBR)$, $CR_{limit\_p1}=F_1(CBR)$, and $CR_{limit\_p2}=F_2(CBR)$, where $F_0(CBR)$, $F_1(CBR)$, and $F_2(CBR)$ are generalized functions for p=0, p=1, and =2, respectively. When transmitting a packet with p=0, a packet with p=1, and a packet with p=2, the UE should ensure that the CR for the packet with p=2 is less than $CR_{limit\_p2}$, the CR for the packet with p=1 is less than $CR_{limit\_p1}+CR_{limit\_p2}$, and the CR for the packet with p=0 is less than $CR_{limit\_p0}+CR_{limit\_p1}+CR_{limit\_p2}$. Therefore, for a higher priority packet, a higher CR may be allowed for UE's transmission of packets. In an aspect, as described above, the generalized function F(CBR) may be configured, e.g., via a pre-configuration within the UE or a dynamic configuration. Thus, each of the channel resource utilization limits may be computed based on pre-configuration within the UE or the dynamic configuration. In an aspect, the pre-configuration may be performed via at least one of the UE or a UICC. In an aspect, the dynamic configuration is performed based on at least one of RRC signaling from a base station, signaling from an ITS sever, or signaling from an operator-controlled server.

According to an aspect of the disclosure, if the UE is transmitting packets with different priorities, then the priority information of the packets may be considered as follows.

When the UE has packets with different priorities for transmission, the UE may determine a $CBR_{limit}$ per priority and a $CR_{limit}$ per priority. Thus, the $CBR_{limit}$ and the $CR_{limit}$ vary based on the priority. In an aspect, if a CBR is below a $CBR_{limit}$ for a particular priority, then the UE may transmit packets with the particular priority. For example, if a CBR is below $CBR_{limit\_p1}$, the UE may transmit packets with the priority p1. On the other hand, if the CBR is greater than or equal to the $CBR_{limit}$ for the particular priority, then the UE may not transmit packets with the particular priority. For example, if a CBR is greater than or equal to $CBR_{limit\_p1}$, the UE may not transmit packets with the priority p1. In an aspect, if the CBR is greater than a $CBR_{limit}$ for a low priority and less than a $CBR_{limit}$ for a high priority, the UE may transmit the packets with the high priority and may not transmit packets with the low priority. For example, in case where $CBR_{limit\_p2} < CBR_{limit\_p1} < CBR_{limit\_p1}$, if the CBR is below $CBR_{limit\_p2}$, the UE may transmit packets with the priority p2 as well as packets with the priority p1 and the packets with priority p0. On the other hand, if the CBR is greater than $CBR_{limit\_p1}$ and less $CBR_{limit\_p0}$, the UE may transmit packets with priority p0 but may not transmit packets with priority p1 or priority p2.

In an aspect, if a CR is below a $CR_{limit}$ for a particular priority, then the UE may transmit packets with the particular priority. For example, if a CR is below $CR_{limit\_p1}$, the UE may transmit packets with the priority p1. On the other hand, if the CR is greater than or equal to the $CR_{limit}$ for the particular priority, then the UE may not transmit packets with the particular priority. For example, if a CR is greater than or equal to the $CR_{limit\_p1}$, the UE may refrain from transmitting packets with the priority p1. In an aspect, if the CR is greater than a $CR_{limit}$ for a low priority and less than a $CR_{limit}$ for a high priority, the UE may transmit the packets with the high priority and may not transmit packets with the low priority. For example, in case where $CR_{limit\_p2} < CR_{limit\_p1} < CR_{limit\_p0}$, if the CR is below $CR_{limit\_p2}$, the UE may transmit packets with the priority p2 as well as packets with the priority p1 and the packets with priority p0. On the other hand, if the CR is greater than $CR_{limit\_p1}$ and less $CR_{limit\_p0}$, the UE may transmit packets with priority p0 but may not transmit packets with priority p1 or priority p2.

If the packets with different priorities are transmitted, the UE may transmit the packets in a particular order based on the different priorities, according to at least one of the following options. According to a first option, the UE may first transmit all higher priority packets before transmitting lower priority packets. In an aspect, before transmission, packets may be placed in different transmit queues based on different priorities. Thus, the UE may empty a queue of higher priority packets to prepare the higher priority packets for transmission before accessing a queue of lower priority packets.

According to a second option, the UE may assign different weights for different priorities, and may transmit packets of different priorities based on the weights. The weight per priority w_p may define a portion of packets with priority p to be transmitted. For example, if the packets have two priorities p1 and p2, weights of w_1=0.75 and w_2=0.25, respectively, three p1 packets for every one p2 packet may be transmitted. Based on a CBR limit per priority, if the set of priorities that the UEs may transmit is P={0, 1, . . . , p-1}, the weights for the priorities may be normalized such that a sum of the normalized weights is equal to 1 within the set P, based on:

$$\overline{w_i} = \frac{w_i}{\Sigma_{k \in P} w_k},$$

where $\overline{w_i}$ is a normalized weight for a priority. In an example where four priorities of packets are possible and w_0=0.6, w_1=0.2, w_2=0.15, w_3=0.05, when packets with priority p0 and priority p1 may be transmitted (e.g., P={0, 1}), w_0 and w_1 may be normalized such that a sum of the normalized weights is equal to 1. Thus, in this example, the normalized w_0=0.75 and the normalized w_1=0.25, such that the sum of the normalized w_0 and the normalized w_1 is 1.

Figure 6:
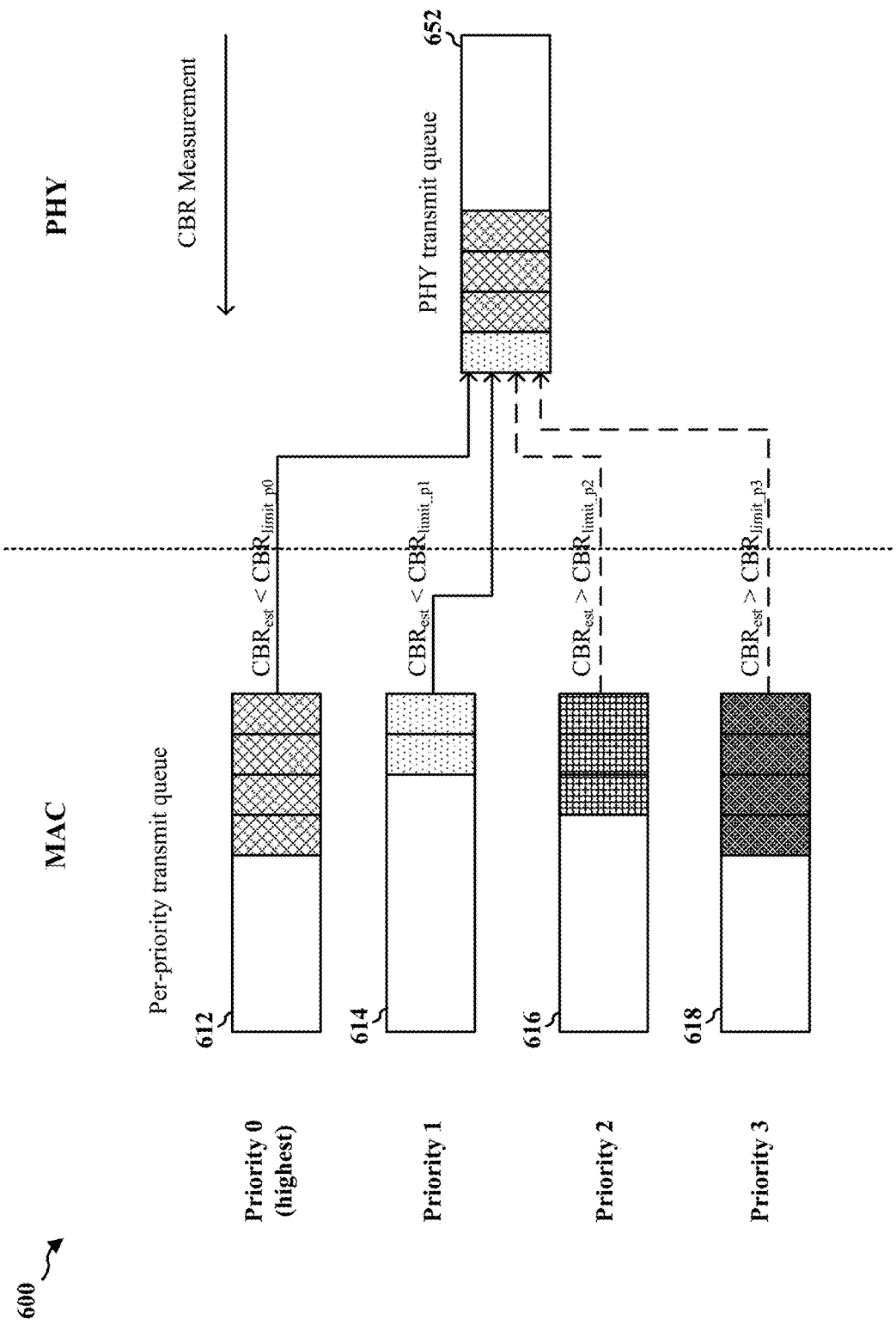
FIG. 6 is an example diagram 600 illustrating transmission of packets with different priorities and different priority weights.

FIG. 6 is an example diagram 600 illustrating transmission of packets with different priorities and different priority weights. At a MAC layer, the packets to be transmitted may be placed in various queues depending on the priorities of the packets. As illustrated, the priority 0 queue 612 has 4 packets, the priority 1 queue 614 has two packets, the priority 2 queue 616 has three packets and the priority 3 queue 618 has four packets. In the example, the $CBR_{est}$ is below the $CBR_{limit\_p0}$ and $CBR_{limit\_p1}$, and thus priority 0 packets and priority 1 packets may be transmitted. The $CBR_{est}$ is greater than the $CBR_{limit\_p2}$ and $CBR_{limit\_p3}$, and thus priority 2 packets and priority 3 packets may not be transmitted. In this example, the normalized w_0=0.75 and the normalized w_1=0.25, and thus three packets of the priority 0 packets for each one packet of the priority 1 packets may be transmitted. The packets to be transmitted may be moved to the physical layer transmit queue 652 for transmission. Three packets from the priority 0 queue 612 and one packet from the priority 1 queue 614 are moved to the physical layer transmit queue 652 for transmission, according to the normalized weights w_0 and w_1.

According to a third option, the weights for the priorities are further based on the CBR. For example, a portion of the weights distributed to a higher priority may increase as a CBR increases. Similarly, a portion of the weights distributed to a lower priority may increase as a CBR decreases. For example, for CBR>x1%, weights may be: {w0,w1,w2}={0.9, 0.09, 0.01}, for x1%>CBR>x2%, weights may be: {w0,w1,w2}={0.6, 0.39, 0.01}, and for x2%>CBR, the weights may be: {w0,w1,w2}={0.5, 0.33, 0.17}. The third option allows reducing the weight for a lower priority if a CBR falls below $CBR_{limit\_priority}$ (thus causing the lower priority queue to empty more slowly), instead of completely refraining from transmitting the packets with the lower priority.

According to an aspect of the disclosure, the control transmission and/or data transmission (e.g., at a physical layer) may include the packet priority information. Then, the UE may determine a $CBR_d$ per priority based on the priority information included in the transmissions. The UE may be configured with a limit for each priority $CBR_{d\_priority}$. The UE may calculate the $CR_{limit}$ per priority based on the $CBR_{d\_priority}$.

Figure 7:
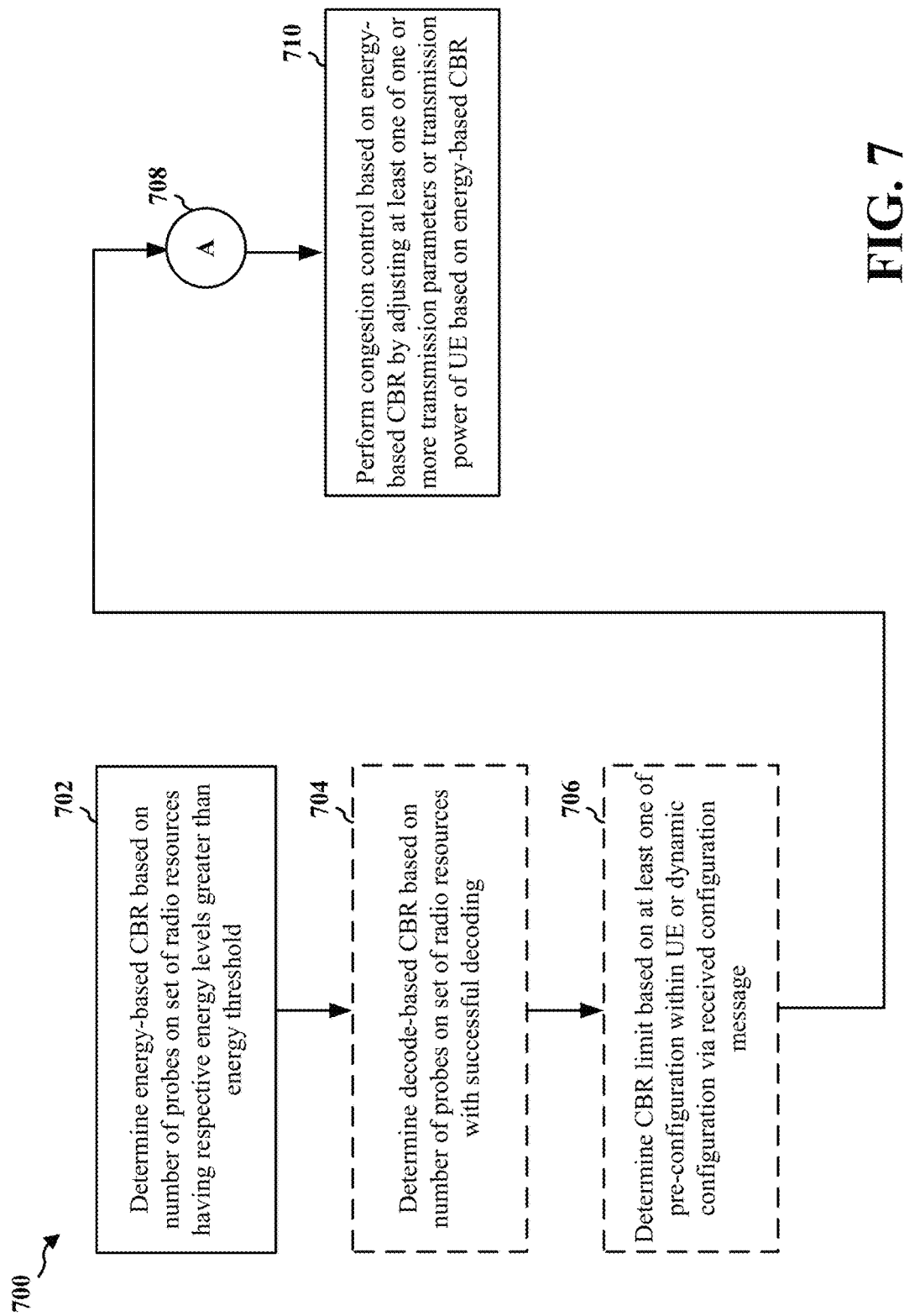
FIG. 7 is a flowchart of a method of wireless communication.

FIG. 7 is a flowchart 700 of a method of wireless communication. The method may be performed by a UE (e.g., the UE 512). At 702, the UE determines an energy-based CBR based on a number of probes on a set of radio resources having respective energy levels greater than an energy threshold. For example, as discussed supra, when computing the $CBR_e$, the UE may make energy measurements using probes on a set of resources, where each probe measures an energy from a respective resource of the set of resources, and may determine a percentage of busy resources based on the energy measurements. For example, as discussed supra, the UE may determine that a resource is busy if energy measured on the resource by a probe is greater than an energy threshold (e.g., resource energy $S>S_{th}$). For example, as discussed supra, in an aspect, the UE may compute the $CBR_e$ by dividing a number of probes whose energy measurements are greater than the energy threshold by a total number of probes ($N_p$).

At 704, the UE may determine a decode-based CBR based on a number of probes on the set of radio resources with successful decoding. In an aspect, each radio resource may be based on a minimum time-frequency unit of resource allocation for the UE. In an aspect, the successful decoding may be determined based on CRC. For example, as discussed supra, the UE may compute the $CBR_d$ based on decoding of a signal on a resource. For example, as discussed supra, when computing the $CBR_d$, the UE may determine whether signals on a set of resources are decoded, where each of probes corresponds to a respective resource of the set of resources, and may determine a percentage of busy resources based on whether a signal on each resource of the set of resources is decoded. For example, as discussed supra, in an aspect, the UE may compute the $CBR_d$ by dividing a number of probes on resources on which signals are decoded by a total number of probes ($N_p$)

At 706, the UE may determine a CBR limit based on at least one of pre-configuration within the UE or dynamic configuration via a received configuration message. In such an aspect, the pre-configuration may be performed via at least one of the UE or a UICC, and the dynamic configuration may be performed based on at least one of RRC signaling from a base station, signaling from an ITS sever, or signaling from an operator-controlled server. For example, as discussed supra, the upper limit for each type of CBR (e.g., $CBR_{limit}$) may be provided via pre-configuration and/or a dynamic configuration. For example, as discussed supra, the pre-configuration may be performed via at least one of the UE or a UICC. For example, as discussed supra, the dynamic configuration is performed based on at least one of RRC signaling from a base station, signaling from an ITS sever, or signaling from an operator-controlled server.

At 708, the UE may perform additional features, as discussed infra.

At 710, the UE performs congestion control based on the energy-based CBR by adjusting at least one transmission parameter of one or more transmission parameters or transmission power of the UE based on the energy-based CBR. For example, as discussed supra, to perform congestion control based on the CBR (e.g., e.g., $CBR_e$, $CBR_d$, $CBR_{control\_e}$, $CBR_{control\_d}$, $CBR_{data\_e}$, $CBR_{data\_d}$), the UE may adjust transmission parameters (e.g., a number of occupied resource, MCS, a transmission rate, a number of HARQ retransmissions, etc.) and/or transmission power of the UE.

In an aspect, the one or more transmission parameters may include at least one of a transmission rate, a number of HARQ transmissions, a number of resources used for transmission, or an MCS. In such an aspect, the adjusting the one or more transmission parameters or the transmit power of the UE may include decreasing a channel resource utilization by performing at least one of: decreasing the transmission rate, decreasing the number of HARQ transmissions, decreasing the number of resources used for transmission, increasing the MCS, or decreasing the transmission power. For example, as discussed supra, the UE may decrease the CR by increasing an MCS. For example, as discussed supra, if the UE performs multiple transmissions, the UE may adjust the number of transmissions to adjust the CR, where decreasing the number of transmissions may decrease the CR. For example, as discussed supra, the UE may decrease the CR by increasing the periodicity duration between transmissions to decrease a transmission rate (e.g., to address congestion) and/or by decreasing the number of HARQ retransmissions.

In an aspect, the UE may perform the congestion control further based on the decode-based CBR. For example, as discussed supra, the UE may perform congestion control based on the CBR (e.g., $CBR_c$, $CBR_d$, $CBR_{control\_c}$, $CBR_{control\_d}$, $CBR_{data\_e}$, $CBR_{data\_d}$).

In an aspect, the UE may perform the congestion control by limiting a channel resource utilization when at least one of the energy-based CBR or the decode-based CBR exceeds the CBR limit. For example, as discussed supra, if the CBR (e.g., $CBR_e$, $CBR_d$, $CBR_{control\_e}$, $CBR_{control\_d}$, $CBR_{data\_e}$, $CBR_{data\_d}$) exceeds the CBR limit, the UE may perform the congestion control by limiting the CR value.

In an aspect, the UE may determine the energy-based CBR by: determining a first energy-based CBR for a set of control resources used for control transmissions and determining a second energy-based CBR for a set of data resources used for data transmissions, where the UE may perform the congestion control based on at least one of the first energy-based CBR or the second energy-based CBR. In an aspect, the UE may determine the energy-based CBR by: determining a first decode-based CBR for the set of control resources and determining a second decode-based CBR for the set of data resources, where the UE may perform the congestion control based on at least one of the first decode-based CBR or the second decode-based CBR. For example, as discussed supra, for systems with separate control resources and data resources, where the control resources are used for control transmissions and the data resources are used for data transmissions, the UE may compute the CBR for control resources and the CBR for data resources separately. For example, as discussed supra, the UE may compute two types of energy-based CBR including an energy-based CBR for control resources $CBR_{control\_e}$ and an energy-based CBR for data resources $CBR_{data\_e}$. For example, as discussed supra, the UE may compute two types of decode-based CBRs including a decode-based CBR for control resources $CBR_{control\_d}$ and a decode-based CBR for data resources $CBR_{data\_d}$. For example, as discussed supra, the UE may perform congestion control based on the CBR (e.g., $CBR_e$, $CBR_d$, $CBR_{control\_e}$, $CBR_{data\_e}$, $CBR_{data\_d}$).

Figures 8A, 8B:
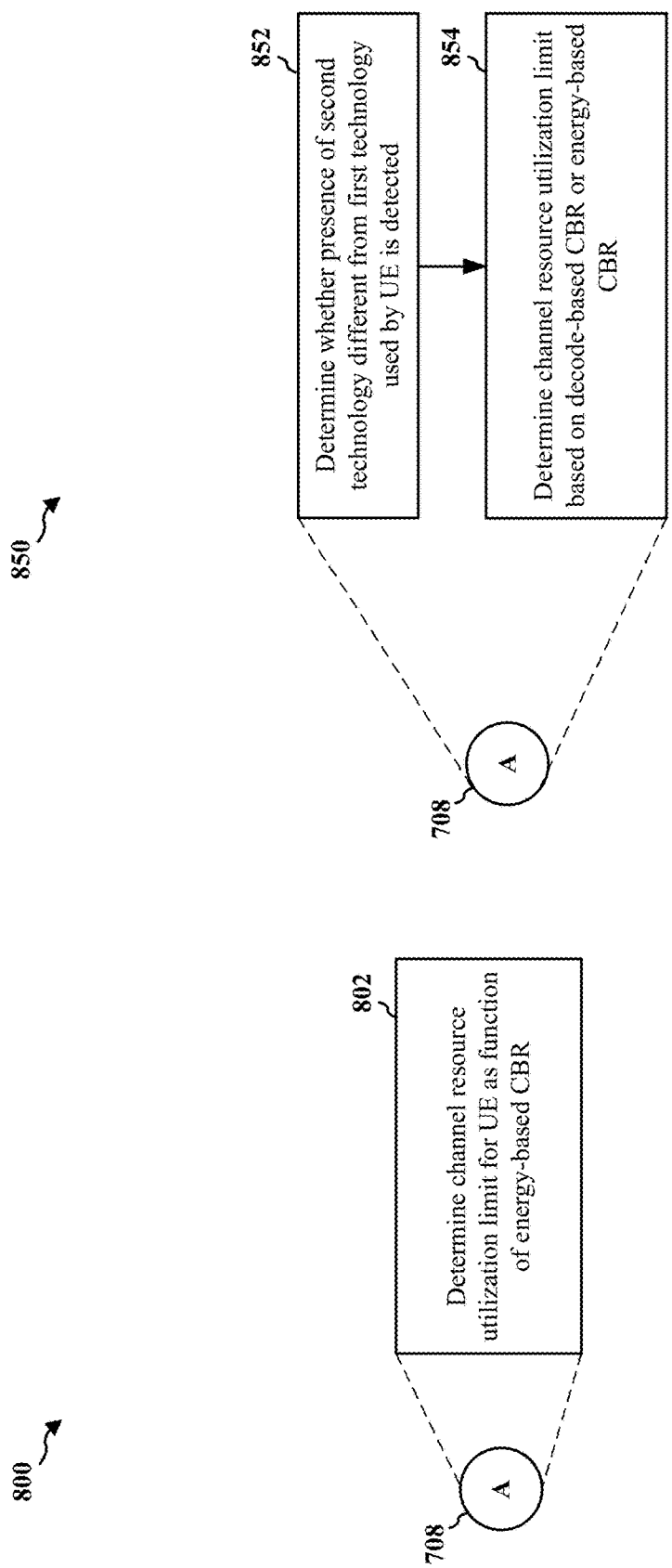
FIG. 8A is a flowchart of a method of wireless communication, expanding from the flowchart of FIG. 7.
FIG. 8B is a flowchart of a method of wireless communication, expanding from the flowchart of FIG. 7.

FIG. 8A is a flowchart 800 of a method of wireless communication, expanding from the flowchart 700 of FIG. 7. The method may be performed by a UE (e.g., the UE 512, the apparatus 1002/1002'). At 708, the UE performs the additional features illustrated in the flowchart 800 of FIG. 8A. At 802, the UE may determine a channel resource utilization limit for the UE as a function of the energy-based CBR. For example, as discussed supra, the function, $$CR_{limit} = \frac{CBR_{limit}}{f^{-1}(CBR)},$$

may be generalized to $CR_{limit}=F(CBR)$, such that the $CR_{limit}$ may be expressed as a function of the CBR, where the CBR may be an energy-based CBR. In such an aspect, the UE may perform the congestion control (e.g., at 710) by adjusting the at least one transmission parameter of the one or more transmission parameters or the transmission power to maintain a channel resource utilization below the channel resource utilization limit that is based on the energy-based CBR. For example, as discussed supra, the UE may adjust the transmission parameters and/or the transmission power of the UE to maintain the CR value to be below the $CR_{limit}$. In such an aspect, the UE may determine the channel resource utilization limit as the function of the energy-based CBR based on at least one of pre-configuration within the UE or dynamic configuration via a received configuration message. In such an aspect, the pre-configuration may be performed via at least one of the UE or a UICC, and the dynamic configuration may be performed based on at least one of RRC signaling from a base station, signaling from an ITS sever, or signaling from an operator-controlled server. For example, as discussed supra, the generalized function F(CBR) may be configured, e.g., via a pre-configuration within the UE or a dynamic configuration. For example, as discussed supra, the pre-configuration may be performed via at least one of the UE or a UICC. For example, as discussed supra, the dynamic configuration is performed based on at least one of RRC signaling from a base station, signaling from an ITS sever, or signaling from an operator-controlled server.

In an aspect, the UE may determine the channel resource utilization limit as the function of the energy-based CBR by: determining a CBR limit, determining a number of other UEs within a communication range of the UE based on the energy-based CBR, and determining the channel resource utilization limit by dividing an energy-based CBR limit by the number of the other UEs within the communication range. For example, as discussed supra, the UE may compute the CR upper limit ($CR_{limit}$) on the channel resource utilization by dividing the $CBR_{limit}$ by a number of stations (e.g., UEs, transmitters) present within a communication range of the UE.

FIG. 8B is a flowchart 850 of a method of wireless communication, expanding from the flowchart 700 of FIG. 7. The method may be performed by a UE (e.g., the UE 512, the apparatus 1002/1002'). In an aspect, at 710, the UE may perform the additional features illustrated in the flowchart 850 of FIG. 8B. At 852, the UE determines whether a second technology different from a first technology used by the UE is detected. For example, as discussed supra, the $CR_{limit}$ may be determined based on either the energy-based CBR or the decode-based CBR, depending on whether the UE detects another technology different from the technology of the UE. In an aspect, the UE may determine whether the second technology is detected by: identifying one or more resources with energy levels greater than a second energy threshold, determining that the second technology is detected if a fraction based on an amount of decodable energy of the one or more resources and an overall energy of the one or more resources is less than an fraction threshold, and determining that the second technology is not detected if the fraction based on the amount of the decodable energy of the one or more resources and the overall energy of the one or more resources is greater than the fraction threshold. For example, as discussed supra, the UE may detect another technology by considering energy instances where energy (Ec) on the resources is greater than a threshold (Th) and decode instances where a signal can be decoded (Ed) for the resources with energy (Ec) greater than a threshold (Th). For example, as discussed supra, if the ratio of the decode instances to the energy instances falls below a technology threshold ($Th_2$), then the UE may determine that another technology is present and may use the $CBR_{limit\_d}$ for coexistence among multiple technologies to compute $CR_{limit}$. For example, as discussed supra, if the ratio of the decode instances to the energy instances does not fall below the technology threshold ($Th_2$), then the UE may determine that another technology is not present and thus uses the $CBR_{limit\_e}$ to compute the $CR_{limit}$.

In such an aspect, at 854, the UE may determine a channel resource utilization limit based on the decode-based CBR or the energy-based CBR, where the channel resource utilization limit is determined as a function of the decode-based CBR if the presence of the second technology is detected, and the channel resource utilization limit is determined as a function of the energy-based CBR if the presence of the second technology is not detected. For example, as discussed supra, the UE may determine the $CR_{limit}$ based on the decode-based CBR if the UE determines another technology is detected. For example, as discussed supra, the UE may determine the $CR_{limit}$ based on the energy-based CBR if the UE determines another technology is not detected. In such an aspect, the UE may perform the congestion control (e.g., at 710) by adjusting the one or more transmission parameters to maintain a channel resource utilization below the channel resource utilization limit. For example, as discussed supra, the UE may adjust the transmission parameters and/or the transmission power of the UE to maintain the CR value to be below the $CR_{limit}$. In an aspect, the energy-based CBR limit may be greater than or equal to the decode-based CBR limit.

In an aspect, the UE may determine the channel resource utilization limit as the function of the decode-based CBR or as the function of the energy-based CBR by: determining a CBR limit, determining a number of other UEs within a communication range of the UE as a function of the energy-based CBR or the decode-based CBR, and determining the channel resource utilization limit by dividing the CBR limit by the UEs within the communication range. For example, as discussed supra, if another technology is detected, the UE may determine the $CR_{limit}$ by dividing $CBR_{limit\_d}$ ($CBR_{limit}$ for $CBR_d$) by a number of stations that is determined based on $CBR_d$. For example, as discussed supra, if another technology is not detected, the UE may determine the $CR_{limit}$ by dividing $CBR_{limit\_e}$ ($CBR_{limit}$ for $CBR_e$) by a number of stations that is determined based on $CBR_e$.

In an aspect, the UE may determine the channel resource utilization limit as the function of the energy-based CBR or the decode-based CBR based on at least one of pre-configuration within the UE or dynamic configuration via a received configuration message. In such an aspect, the pre-configuration may be performed via at least one of the UE or a UICC, and the dynamic configuration is performed based on at least one of RRC signaling from a base station, signaling from an ITS sever, or signaling from an operator-controlled server. For example, as discussed supra, the generalized function F(CBR) may be configured, e.g., via a pre-configuration within the UE or a dynamic configuration, where the CBR may be $CBR_e$ or $CBR_d$. For example, as discussed supra, the pre-configuration may be performed via at least one of the UE or a UICC. For example, as discussed supra, the dynamic configuration is performed based on at least one of RRC signaling from a base station, signaling from an ITS sever, or signaling from an operator-controlled server.

Figure 9:
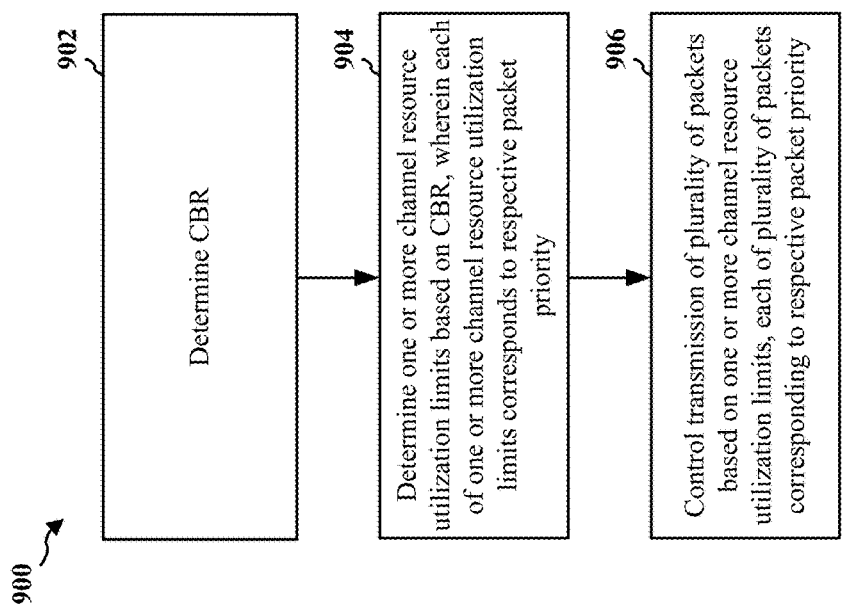
FIG. 9 is a flowchart of a method of wireless communication.

FIG. 9 is a flowchart 900 of a method of wireless communication. The method may be performed by a UE (e.g., the UE 512, the apparatus 1002/1002'). At 902, the UE determines a CBR. At 904, the UE determines one or more channel resource utilization limits based on the CBR, where each channel resource utilization limit of the one or more channel resource utilization limits corresponds to a respective packet priority. For example, as discussed supra, the UE may compute channel resource utilization limits according to respective packet priorities of packets being transmitted. For example, as discussed supra, each channel resource utilization limit corresponding to a respective packet priority may be computed based on the CBR, based on the generalized function F(CBR) configured for the respective packet priority. In an aspect, a channel resource utilization limit of the one or more channel resource utilization limit may be higher for a higher packet priority. For example, as discussed supra, a higher CR limit may be used for a higher priority packet.

In an aspect, the one or more channel resource utilization limits based on the CBR may be determined based on at least one of pre-configuration within the UE or dynamic configuration via a received configuration message. In such an aspect, the pre-configuration may be performed via at least one of the UE or a UICC, and the dynamic configuration is performed based on at least one of RRC signaling from a base station, signaling from an ITS sever, or signaling from an operator-controlled server. For example, as discussed supra, each of the channel resource utilization limits may be computed based on pre-configuration within the UE or the dynamic configuration. For example, as discussed supra, the pre-configuration may be performed via at least one of the UE or a UICC. For example, as discussed supra, the dynamic configuration is performed based on at least one of RRC signaling from a base station, signaling from an ITS sever, or signaling from an operator-controlled server.

In an aspect, each channel resource utilization limit of the one or more channel resource utilization limit may be determined by: determining a CBR limit for a corresponding packet priority, determining a number of other UEs within a communication range of the UE as a function of the CBR, and determining a channel resource utilization limit for the corresponding packet priority by dividing the CBR limit for the corresponding packet priority by the number of other UEs within the communication range of the UE. For example, as discussed supra, the UE may compute the CR upper limit ($CR_{limit}$) on the channel resource utilization by dividing the $CBR_{limit}$ by a number of stations (e.g., UEs, transmitters) present within a communication range of the UE. In such an aspect, the CBR limit may be higher for a higher packet priority. For example, as discussed supra, a higher $CBR_{limit}$ may be used for a higher priority packet. In such an aspect, the CBR limit may be configured based on at least one of pre-configuration within the UE or dynamic configuration via a received configuration message. In such an aspect, the pre-configuration may be performed via at least one of the UE or a UICC, and the dynamic configuration is performed based on at least one of RRC signaling from a base station, signaling from an ITS sever, or signaling from an operator-controlled server. For example, as discussed supra, the upper limit for each type of CBR (e.g., $CBR_{limit}$) may be provided via pre-configuration and/or a dynamic configuration. For example, as discussed supra, the pre-configuration may be performed via at least one of the UE or a UICC. For example, as discussed supra, the dynamic configuration is performed based on at least one of RRC signaling from a base station, signaling from an ITS sever, or signaling from an operator-controlled server.

At 906, the UE may control transmission of a plurality of packets based on the one or more channel resource utilization limits, each packet of the plurality of packets being associated with a respective packet priority. In an aspect, the UE may control the transmission of the plurality of packets by: controlling transmission of a packet of the plurality packets based at least on the determined channel resource utilization limit that corresponds to the respective priority of the packet. For example, as discussed supra, the UE may control transmission of packets based on CR limits that correspond to respective packet priorities, where a higher CR limit may be used for a higher priority packet.

In an aspect, the UE may control the transmission of the plurality of packets by:

if a channel resource utilization for a corresponding packet priority is below the corresponding channel resource utilization limit, transmitting each packet of the plurality of packets associated with the corresponding packet priority, and if the channel resource utilization for the corresponding packet priority is greater than or equal to the corresponding channel resource utilization limit, refraining from transmitting each packet of the plurality of packets associated with the corresponding packet priority. For example, as discussed supra, if a CR is below a $CR_{limit}$ for a particular priority, then the UE may transmit packets with the particular priority. For example, as discussed supra, if the CR is greater than or equal to the $CR_{limit}$ for the particular priority, then the UE may not transmit packets with the particular priority.

In an aspect, the UE may control the transmission of the plurality of packets by transmitting each packet of the plurality of packets with a higher packet priority before transmitting one or more packets of the plurality of packets with a lower packet priority if the plurality of packets with at least two different packet priorities are allowed to be transmitted. For example, as discussed supra, if the packets with different priorities are transmitted, the UE may transmit the packets in a particular order based on the different priorities. For example, as discussed supra, the UE may first transmit all higher priority packets before transmitting lower priority packets.

In an aspect, the UE may control the transmission of the plurality of packets by assigning a weight for each packet priority, where the weight defines a portions of packets to be transmitted for a corresponding priority, and transmitting the plurality of packets with at least two different packet priorities based on the weight for each packet priority in an order of packet priority. For example, as discussed supra, the UE may assign different weights for different priorities, and may transmit packets of different priorities based on the weights. In such an aspect, the weight for each packet priority may be based on the CBR. For example, as discussed supra, the weights for the priorities may be further based on the CBR.

In an aspect, packet priority information about packet priorities of the plurality of packets may be included in at least one of control transmission or data transmission, and the determining the CBR includes determining a decode-based CBR based on the packet priority information. For example, as discussed supra, the control transmission and/or data transmission (e.g., at a physical layer) may include the packet priority information. Then, for example, as discussed supra, the UE may determine a $CBR_d$ per priority based on the priority information included in the transmissions.

Figure 10:
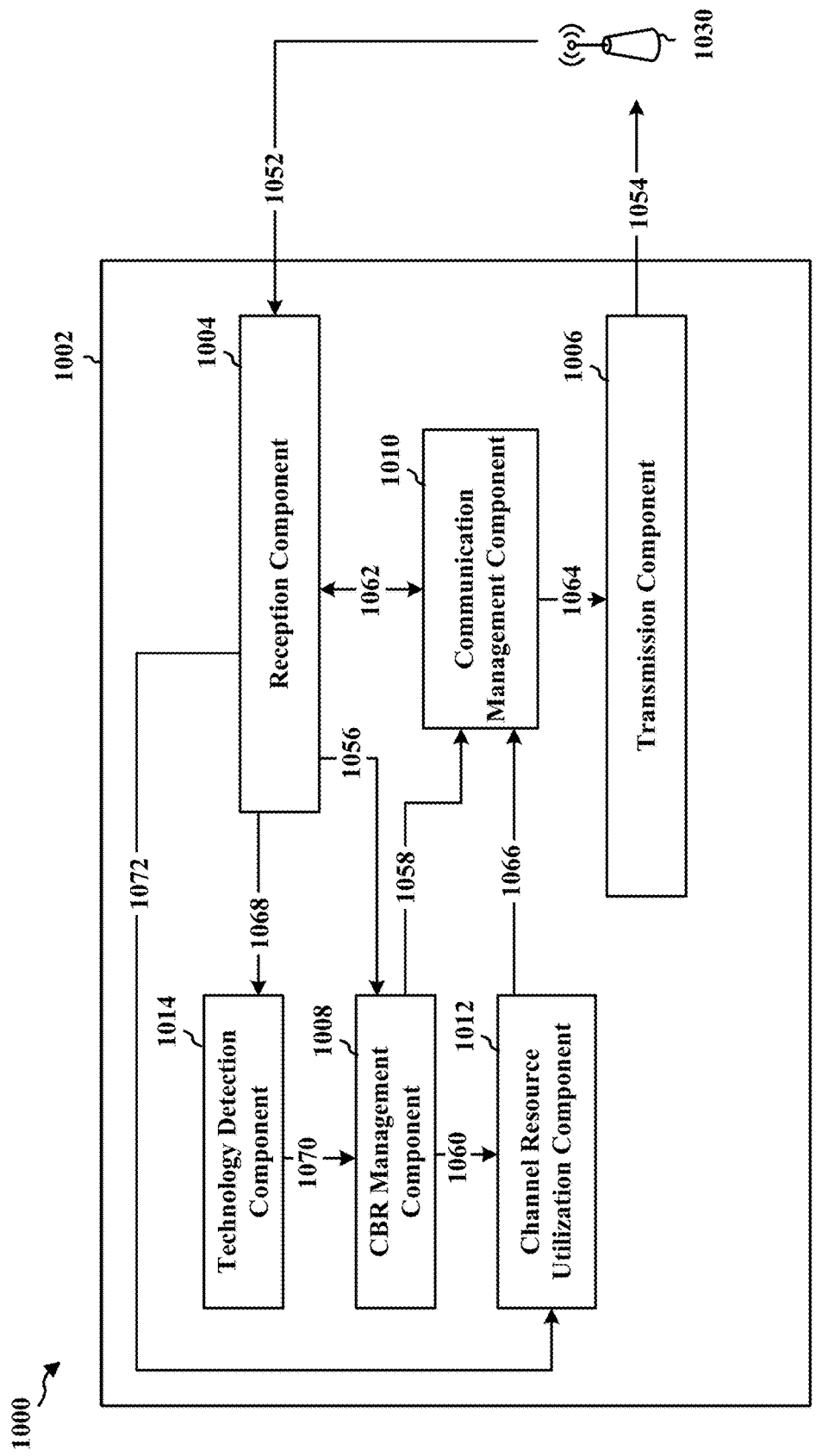
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be a UE. The apparatus includes a reception component 1004, a transmission component 1006, a CBR management component 1008, a communication management component 1010, a channel resource utilization component 1012, and a technology detection component 1014. The apparatus may receive communication from a base station 1030 via the reception component 1004 at 1052, and may transmit communication to the base station 1030 via the transmission component 1006 at 1054.

According to one aspect of the disclosure, the CBR management component 1008 determines an energy-based CBR based on a number of probes on a set of radio resources having respective energy levels greater than an energy threshold (e.g., via the reception component 1004 at 1052 and 1056). The CBR management component 1008 may forward the energy-based CBR to the communication management component 1010, at 1058, and/or to the channel resource utilization component 1012, at 1060.

In an aspect, the CBR management component 1008 may determine a decode-based CBR based on a number of probes on the set of radio resources with successful decoding. In an aspect, each radio resource may be based on a minimum time-frequency unit of resource allocation for the UE. In an aspect, the successful decoding may be determined based on CRC. The CBR management component 1008 may forward the decode-based CBR to the communication management component 1010, at 1058, and/or to the channel resource utilization component 1012, at 1060.

The CBR management component 1008 may determine a CBR limit based on at least one of pre-configuration within the UE or dynamic configuration via a received configuration message. In such an aspect, the pre-configuration is performed via at least one of the UE or a UICC, and the dynamic configuration is performed based on at least one of RRC signaling from a base station (e.g., base station 1030), signaling from an ITS sever, or signaling from an operator-controlled server (e.g., via the reception component 1004, at 1056).

The communication management component 1010 performs congestion control based on the energy-based CBR by adjusting at least one transmission parameter of one or more transmission parameters or transmission power of the UE based on the energy-based CBR (e.g., by communicating with the reception component 1004 at 1062 and the transmission component 1006 at 1064).

In an aspect, the one or more transmission parameters may include at least one of a transmission rate, a number of HARQ transmissions, a number of resources used for transmission, or an MCS. In such an aspect, the adjusting the one or more transmission parameters or the transmit power of the UE may include decreasing a channel resource utilization by performing at least one of: decreasing the transmission rate, decreasing the number of HARQ transmissions, decreasing the number of resources used for transmission, increasing the MCS, or decreasing the transmission power.

In an aspect, the communication management component 1010 may perform the congestion control further based on the decode-based CBR.

In an aspect, the communication management component 1010 may perform the congestion control by limiting a channel resource utilization when at least one of the energy-based CBR or the decode-based CBR exceeds the CBR limit.

In an aspect, the CBR management component 1008 may determine the energy-based CBR by: determining a first energy-based CBR for a set of control resources used for control transmissions and determining a second energy-based CBR for a set of data resources used for data transmissions, where the communication management component 1010 may perform the congestion control based on at least one of the first energy-based CBR or the second energy-based CBR. In an aspect, the CBR management component 1008 may determine the energy-based CBR by: determining a first decode-based CBR for the set of control resources and determining a second decode-based CBR for the set of data resources, where the communication management component 1010 may perform the congestion control based on at least one of the first decode-based CBR or the second decode-based CBR.

In an aspect, the channel resource utilization component 1012 may determine a channel resource utilization limit for the UE as a function of the energy-based CBR. The channel resource utilization component 1012 may forward the channel resource utilization limit to the communication management component 1010, at 1066. In such an aspect, the communication management component 1010 may perform the congestion control by adjusting the one or more transmission parameters to maintain a channel resource utilization below the channel resource utilization limit that is based on the energy-based CBR. In such an aspect, the channel resource utilization component 1012 may determine the channel resource utilization limit as the function of the energy-based CBR based on at least one of pre-configuration within the UE or dynamic configuration via a received configuration message. In such an aspect, the pre-configuration is performed via at least one of the UE or a UICC, and the dynamic configuration is performed based on at least one of RRC signaling from a base station (e.g., base station 1030), signaling from an ITS sever, or signaling from an operator-controlled server (e.g., via the reception component 1004, at 1072).

In an aspect, the channel resource utilization component 1012 may determine the channel resource utilization limit as the function of the energy-based CBR by: determining a CBR limit, determining a number of other UEs within a communication range of the UE based on the energy-based CBR, and determining the channel resource utilization limit by dividing an energy-based CBR limit by the number of the other UEs within the communication range.

In an aspect, the technology detection component 1014 may determine whether a second technology different from a first technology used by the UE is detected (e.g., via the reception component 1004, at 1068). In an aspect, the technology detection component 1014 may determine whether the second technology is detected by: identifying one or more resources with energy levels greater than an energy threshold, determining that the second technology is detected if a fraction based on an amount of decodable energy of the one or more resources and an overall energy of the one or more resources is less than an fraction threshold, and determining that the second technology is not detected if the fraction based on the amount of the decodable energy of the one or more resources and the overall energy of the one or more resources is greater than the fraction threshold. The technology detection component 1014 may indicate, to the CBR management component 1008 at 1070, whether a second technology different from a first technology used by the UE is detected In such an aspect, the channel resource utilization component 1012 may determine a channel resource utilization limit based on the decode-based CBR or the energy-based CBR, where the channel resource utilization limit is determined as a function of the decode-based CBR if the presence of the second technology is detected, and the channel resource utilization limit is determined as a function of the energy-based CBR if the presence of the second technology is not detected. In such an aspect, the communication management component 1010 may perform the congestion control by adjusting the one or more transmission parameters to maintain a channel resource utilization below the channel resource utilization limit. In an aspect, the energy-based CBR limit may be greater than or equal to the decode-based CBR limit.

In an aspect, the channel resource utilization component 1012 may determine the channel resource utilization limit as the function of the decode-based CBR or as the function of the energy-based CBR by: determining a CBR limit, determining a number of other UEs within a communication range of the UE as a function of the energy-based CBR or the decode-based CBR, and determining the channel resource utilization limit by dividing the CBR limit by the UEs within the communication range.

In an aspect, the channel resource utilization component 1012 may determine the channel resource utilization limit as the function of the energy-based CBR or the decode-based CBR based on at least one of pre-configuration within the UE or dynamic configuration via a received configuration message. In such an aspect, the pre-configuration is performed via at least one of the UE or a UICC, and the dynamic configuration is performed based on at least one of RRC signaling from a base station (e.g., base station 1030), signaling from an ITS sever, or signaling from an operator-controlled server (e.g., via the reception component 1004, at 1072).

According to another aspect of the disclosure, the CBR management component 1008 determines a CBR. The CBR management component 1008 may forward the CBR to the channel resource utilization component 1012, at 1060. The channel resource utilization component 1012 determines one or more channel resource utilization limits based on the CBR, where each channel resource utilization limit of the one or more channel resource utilization limits corresponds to a respective packet priority. The channel resource utilization component 1012 may forward the one or more channel resource utilization limits to the communication management component 1010, at 1066. In an aspect, a channel resource utilization limit of the one or more channel resource utilization limit is higher for a higher packet priority.

In an aspect, the channel resource utilization component 1012 may determine the one or more channel resource utilization limits based on the CBR, based on at least one of pre-configuration within the UE or dynamic configuration via a received configuration message. In such an aspect, the pre-configuration may be performed via at least one of the UE or a UICC, and the dynamic configuration is performed based on at least one of RRC signaling from a base station, signaling from an ITS sever, or signaling from an operator-controlled server.

In an aspect, each channel resource utilization limit of the one or more channel resource utilization limit may be determined by: determining a CBR limit for a corresponding packet priority, determining a number of other UEs within a communication range of the UE as a function of the CBR, and determining a channel resource utilization limit for the corresponding packet priority by dividing the CBR limit for the corresponding packet priority by the number of other UEs within the communication range of the UE. In such an aspect, the CBR limit is higher for a higher packet priority. In such an aspect, the CBR limit may be configured based on at least one of pre-configuration within the UE or dynamic configuration via a received configuration message. In such an aspect, the pre-configuration may be performed via at least one of the UE or a UICC, and the dynamic configuration is performed based on at least one of RRC signaling from a base station, signaling from an ITS sever, or signaling from an operator-controlled server.

The communication management component 1010 controls, via the transmission component 1006 at 1064, transmission of a plurality of packets based on the one or more channel resource utilization limits, each packet of the plurality of packets being associated with a respective packet priority. In an aspect, the communication management component 1010 may control the transmission of the plurality of packets by: controlling transmission of a packet of the plurality packets based at least on the determined channel resource utilization limit that corresponds to the respective priority of the packet.

In an aspect, the communication management component 1010 may control the transmission of the plurality of packets by: if a channel resource utilization for a corresponding packet priority is below the corresponding channel resource utilization limit, transmitting each packet of the plurality of packets associated with the corresponding packet priority, and if the channel resource utilization for the corresponding packet priority is greater than or equal to the corresponding channel resource utilization limit, refraining from transmitting each packet of the plurality of packets associated with the corresponding packet priority.

In an aspect, the communication management component 1010 may control the transmission of the plurality of packets by transmitting each packet of the plurality of packets with a higher packet priority before transmitting one or more packets of the plurality of packets with a lower packet priority if the plurality of packets with at least two different packet priorities are allowed to be transmitted. In an aspect, the communication management component 1010 may control the transmission of the plurality of packets by assigning a weight for each packet priority, where the weight defines a portions of packets to be transmitted for a corresponding priority, and transmitting the plurality of packets with at least two different packet priorities based on the weight for each packet priority in an order of packet priority. In such an aspect, the weight for each packet priority may be based on the CBR.

In an aspect, packet priority information for each packet of the plurality of packets is included in at least one of control transmission or data transmission, and the determining the CBR includes determining a decode-based CBR based on the packet priority information The apparatus may include additional components that perform each of the blocks of the algorithm in the aforementioned flowcharts of FIGS. 7-9. As such, each block in the aforementioned flowcharts of FIGS. 7-9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
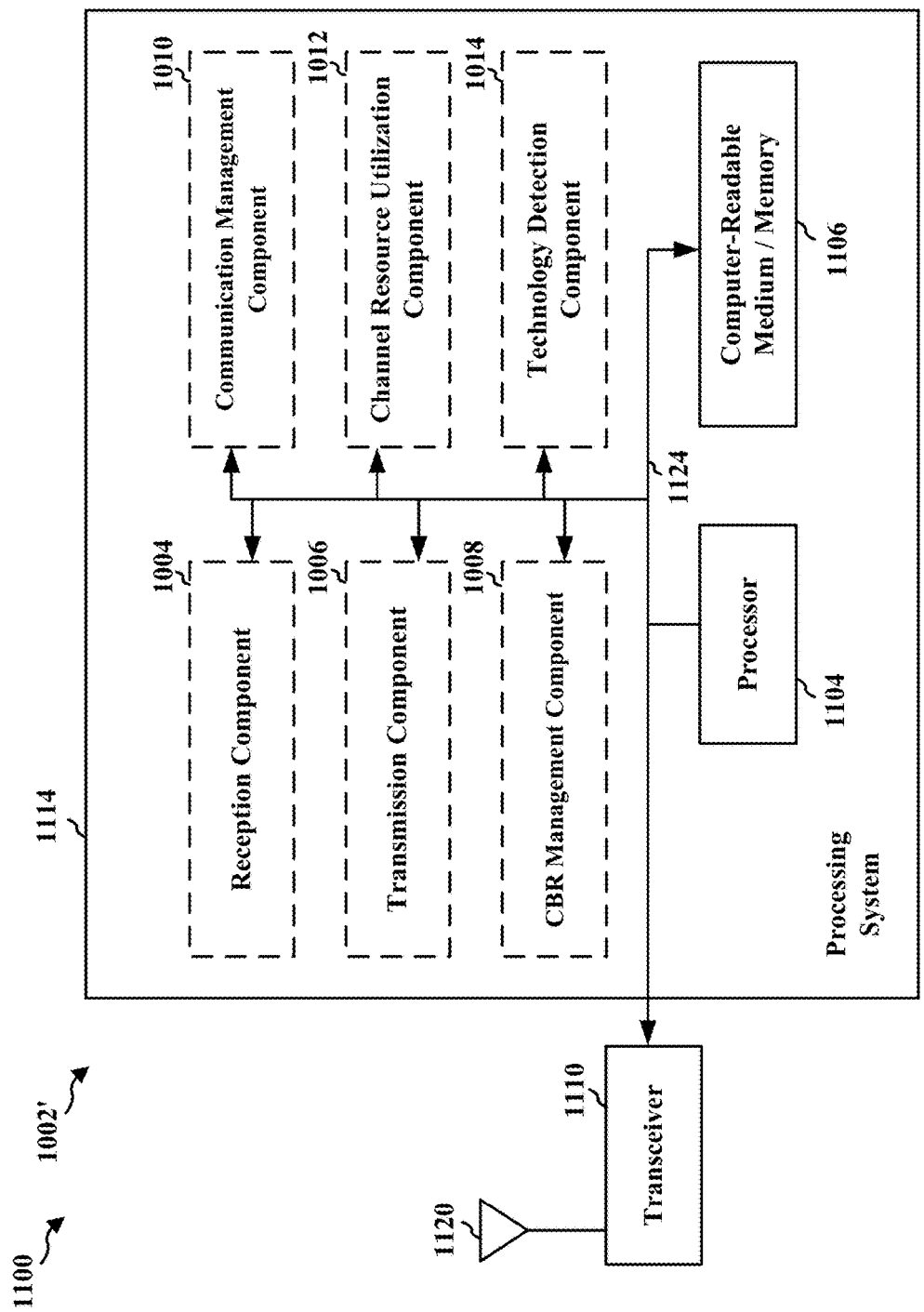
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359.

In one configuration, the apparatus 1002/1002' for wireless communication includes means for determining an energy-based CBR based on a number of probes on a set of radio resources having respective energy levels greater than an energy threshold, and means for performing congestion control based on the energy-based CBR by adjusting at least one transmission parameter of one or more transmission parameters or transmission power of the UE based on the energy-based CBR. In an aspect, the apparatus 1002/1002' further includes means for determining a channel resource utilization limit for the UE as a function of the energy-based CBR, where the means for performing the congestion control is configured to adjust the at least one transmission parameter of the one or more transmission parameters or the transmission power to maintain a channel resource utilization below the channel resource utilization limit that is based on the energy-based CBR. In an aspect, the means for determining the channel resource utilization limit as the function of the energy-based CBR is configured to determine the channel resource utilization limit based on at least one of pre-configuration within the UE or dynamic configuration via a received configuration message. In an aspect, the means for determining the channel resource utilization limit as the function of the energy-based CBR is configured to: determine a CBR limit, determine a number of other UEs within a communication range of the UE based on the energy-based CBR, and determine the channel resource utilization limit by dividing an energy-based CBR limit by the number of the other UEs within the communication range. In an aspect, the apparatus 1002/1002' further includes means for determining a decode-based CBR based on the number of probes on the set of radio resources with successful decoding, where the means for performing the congestion control is configured to perform the congestion control based on the decode-based CBR.

In an aspect, the means for determining the energy-based CBR is configured to: determine a first energy-based CBR for a set of resources used for control transmissions and determining a second energy-based CBR for a set of resources used for data transmissions, where the means for performing the congestion control is configured to perform the congestion control based on at least one of the first energy-based CBR or the second energy-based CBR. In an aspect, the means for determining the decode-based CBR is configured to: determine a first decode-based CBR for a set of resources used for control transmissions and determining a second decode-based CBR for a set of resources used for data transmissions, where the means for performing the congestion control is configured to perform the congestion control based on at least one of the first decode-based CBR or the second decode-based CBR.

In an aspect, the apparatus 1002/1002' further includes means for determining a CBR limit based on at least one of pre-configuration within the UE or dynamic configuration via a received configuration message, where the means for performing the congestion control is configured to limit a channel resource utilization when at least one of the energy-based CBR or the decode-based CBR exceeds the CBR limit.

In an aspect, the apparatus 1002/1002' further includes means for determining whether a second technology different from a first technology used by the UE is detected, and means for determining a channel resource utilization limit for the UE based on the decode-based CBR or the energy-based CBR, wherein the channel resource utilization limit is determined as a function of the decode-based CBR if the presence of the second technology is detected, and the channel resource utilization limit is determined as a function of the energy-based CBR if the presence of the second technology is not detected, where the means for performing the congestion control is configured to adjust the one or more transmission parameters to maintain a channel resource utilization below the channel resource utilization limit. In such an aspect, the means for determining the channel resource utilization limit as the function of the decode-based CBR or as the function of the energy-based CBR is configured to: determine a CBR limit, determine a number of other UEs within a communication range of the UE as a function of the energy-based CBR or the decode-based CBR, and determine the channel resource utilization limit by dividing the CBR limit by the UEs within the communication range. In such an aspect, the means for determining the channel resource utilization limit as the function of the energy-based CBR or the decode-based CBR is configured to determine channel resource utilization limit based on at least one of pre-configuration within the UE or dynamic configuration via a received configuration message. In an aspect, the means for the determining whether the second technology is detected is configured to: identify one or more resources with energy levels greater than a second energy threshold, determine that the second technology is detected if a fraction based on an amount of decodable energy of the one or more resources and an overall energy of the one or more resources is less than an fraction threshold, and determine that the second technology is not detected if the fraction based on the amount of the decodable energy of the one or more resources and the overall energy of the one or more resources is greater than the fraction threshold.

In another configuration, the apparatus 1002/1002' for wireless communication includes means for determining a CBR, means for determining one or more channel resource utilization limits based on the CBR, wherein each channel resource utilization limit of the one or more channel resource utilization limits corresponds to a respective packet priority, and means for controlling transmission of a plurality of packets based on the one or more channel resource utilization limits, each packet of the plurality of packets being associated with a respective packet priority. In an aspect, the means for controlling the transmission of the plurality of packets is configured to control transmission of a packet of the plurality packets based at least on the determined channel resource utilization limit that corresponds to the respective priority of the packet. In an aspect, the means for controlling the transmission of the plurality of packets is configured to: if a channel resource utilization for a corresponding packet priority is below the corresponding channel resource utilization limit, transmitting each packet of the plurality of packets associated with the corresponding packet priority, and if the channel resource utilization for the corresponding packet priority is greater than or equal to the corresponding channel resource utilization limit, refraining from transmitting each packet of the plurality of packets associated with the corresponding packet priority. In an aspect, the means for controlling the transmission of the plurality of packets is configured to: if the plurality of packets with at least two different packet priorities are allowed to be transmitted, transmit each packet of the plurality of packets with a higher packet priority before transmitting one or more packets of the plurality of packets with a lower packet priority. In an aspect, the means for controlling the transmission of the plurality of packets is configured to: assign a weight for each packet priority, wherein the weight defines a portions of packets to be transmitted for a corresponding packet priority, and transmit the plurality of packets with at least two different packet priorities based on the weight for each packet priority in an order of packet priority. In an aspect, packet priority information for each packet of the plurality of packets is included in at least one of control transmission or data transmission, and the means for determining the CBR is configured to determine a decode-based CBR based on the packet priority information.

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), comprising:
   determining a channel busy ratio (CBR);
   determining one or more channel resource utilization limits based on the CBR, wherein each channel resource utilization limit of the one or more channel resource utilization limits corresponds to a respective packet priority, the channel resource utilization limit being a function of a CBR limit and a number of other UEs within a communication range of the UE; and
   controlling transmission of a plurality of packets based on the one or more channel resource utilization limits, each packet of the plurality of packets having a packet priority.

2. The method of claim 1, wherein a channel resource utilization limit of the one or more channel resource utilization limits is higher for a higher packet priority.

3. The method of claim 1, wherein the controlling the transmission of the plurality of packets comprises controlling transmission of a packet of the plurality of packets based at least on the determined channel resource utilization limit that corresponds to the respective priority of the packet.

4. The method of claim 1, wherein the determining the one or more channel resource utilization limits based on the CBR is based on at least one of pre-configuration within the UE or dynamic configuration via a received configuration message.

5. The method of claim 1, wherein each channel resource utilization limit of the one or more channel resource utilization limit is determined by:

determining the CBR limit for a corresponding packet priority; and determining the number of other UEs within a communication range of the UE as a function of the CBR; and determining a channel resource utilization limit for the corresponding packet priority by dividing the CBR limit for the corresponding packet priority by the number of other UEs within the communication range of the UE.

6. The method of claim 5, wherein the CBR limit is higher for a higher packet priority.

7. The method of claim 6, wherein the CBR limit is configured based on at least one of pre-configuration within the UE or dynamic configuration via a received configuration message.

8. The method of claim 1, wherein the controlling the transmission of the plurality of packets comprises:
if a channel resource utilization for a corresponding packet priority is below the corresponding channel resource utilization limit, transmitting each packet of the plurality of packets associated with the corresponding packet priority; and
if the channel resource utilization for the corresponding packet priority is greater than or equal to the corresponding channel resource utilization limit, refraining from transmitting each packet of the plurality of packets associated with the corresponding packet priority.

9. The method of claim 1, wherein the controlling the transmission of the plurality of packets comprises:
if the plurality of packets with at least two different packet priorities are allowed to be transmitted, transmitting each packet of the plurality of packets with a higher packet priority before transmitting one or more packets of the plurality of packets with a lower packet priority.

10. The method of claim 1, wherein the controlling the transmission of the plurality of packets comprises:
assigning a weight for each packet priority, wherein the weight defines a portion of packets to be transmitted for a corresponding packet priority; and
transmitting the plurality of packets with at least two different packet priorities based on the weight for each packet priority in an order of packet priority.

11. The method of claim 10, wherein the weight for each packet priority is based on the CBR.

12. The method of claim 1, wherein packet priority information for each packet of the plurality of packets is included in at least one of control transmission or data transmission, and
wherein the determining the CBR includes determining a decode-based CBR based on the packet priority information.

13. A user equipment (UE) for wireless communication, comprising:
a memory; and
at least one processor coupled to the memory and configured to:
determine a channel busy ratio (CBR);
determine one or more channel resource utilization limits based on the CBR, wherein each channel resource utilization limit of the one or more channel resource utilization limits corresponds to a respective packet priority, the channel resource utilization limit being a function of a CBR limit and a number of other UEs within a communication range of the UE; and
control transmission of a plurality of packets based on the one or more channel resource utilization limits, each packet of the plurality of packets having a packet priority.

14. The UE of claim 13, wherein a channel resource utilization limit of the one or more channel resource utilization limit is higher for a higher packet priority.

15. The UE of claim 13, wherein the at least one processor configured to control the transmission of the plurality of packets is configured to control transmission of a packet of the plurality of packets based at least on the determined channel resource utilization limit that corresponds to the respective priority of the packet.

16. The UE of claim 13, wherein each channel resource utilization limit of the one or more channel resource utilization limit is determined by:
determining the CBR limit for a corresponding packet priority;
determining the number of other UEs within a communication range of the UE as a function of the CBR; and
determining a channel resource utilization limit for the corresponding packet priority by dividing the CBR limit for the corresponding packet priority by the number of other UEs within the communication range of the UE.

17. The UE of claim 16, wherein the CBR limit is higher for a higher packet priority.

18. The UE of claim 13, wherein the at least one processor configured to control the transmission of the plurality of packets is configured to:
if a channel resource utilization for a corresponding packet priority is below the corresponding channel resource utilization limit, transmit each packet of the plurality of packets associated with the corresponding packet priority; and
if the channel resource utilization for the corresponding packet priority is greater than or equal to the corresponding channel resource utilization limit, refrain from transmitting each packet of the plurality of packets associated with the corresponding packet priority.

19. The UE of claim 13, wherein the at least one processor configured to control the transmission of the plurality of packets is configured to:
if the plurality of packets with at least two different packet priorities are allowed to be transmitted, transmit each packet of the plurality of packets with a higher packet priority before transmitting one or more packets of the plurality of packets with a lower packet priority.

20. The UE of claim 13, wherein the at least one processor configured to control the transmission of the plurality of packets is configured to:
assign a weight for each packet priority, wherein the weight defines a portion of packets to be transmitted for a corresponding packet priority; and
transmit the plurality of packets with at least two different packet priorities based on the weight for each packet priority in an order of packet priority.

21. The UE of claim 20, wherein the weight for each packet priority is based on the CBR.

22. The UE of claim 13, wherein packet priority information for each packet of the plurality of packets is included in at least one of control transmission or data transmission, and
wherein the at least one processor configured to determine the CBR is configured to determine a decode-based CBR based on the packet priority information.

23. A user equipment (UE) for wireless communication, comprising:
- means for determining a channel busy ratio (CBR);
- means for determining one or more channel resource utilization limits based on the CBR, wherein each channel resource utilization limit of the one or more channel resource utilization limits corresponds to a respective packet priority, the channel resource utilization limit being a function of a CBR limit and a number of other UEs within a communication range of the UE; and
- means for controlling transmission of a plurality of packets based on the one or more channel resource utilization limits, each packet of the plurality of packets having a packet priority.

24. The UE of claim 23, wherein the means for controlling the transmission of the plurality of packets is configured to control transmission of a packet of the plurality of packets based at least on the determined channel resource utilization limit that corresponds to the respective priority of the packet.

25. The UE of claim 23, wherein each channel resource utilization limit of the one or more channel resource utilization limit is determined by:
- determining the CBR limit for a corresponding packet priority;
- determining the number of other UEs within a communication range of the UE as a function of the CBR; and
- determining a channel resource utilization limit for the corresponding packet priority by dividing the CBR limit for the corresponding packet priority by the number of other UEs within the communication range of the UE.

26. The UE of claim 23, wherein the means for controlling the transmission of the plurality of packets is configured to:
- if a channel resource utilization for a corresponding packet priority is below the corresponding channel resource utilization limit, transmit each packet of the plurality of packets associated with the corresponding packet priority; and
- if the channel resource utilization for the corresponding packet priority is greater than or equal to the corresponding channel resource utilization limit, refrain from transmitting each packet of the plurality of packets associated with the corresponding packet priority.

27. The UE of claim 23, wherein the means for controlling the transmission of the plurality of packets is configured to:
- if the plurality of packets with at least two different packet priorities are allowed to be transmitted, transmit each packet of the plurality of packets with a higher packet priority before transmitting one or more packets of the plurality of packets with a lower packet priority.

28. The UE of claim 23, wherein the means for controlling the transmission of the plurality of packets is configured to:
- assign a weight for each packet priority, wherein the weight defines a portion of packets to be transmitted for a corresponding packet priority; and
- transmit the plurality of packets with at least two different packet priorities based on the weight for each packet priority in an order of packet priority.

29. The UE of claim 23, wherein packet priority information for each packet of the plurality of packets is included in at least one of control transmission or data transmission, and
- wherein the means for determining the CBR is configured to determine a decode-based CBR based on the packet priority information.

30. A non-transitory computer-readable medium storing computer executable code, comprising code to:
- determine a channel busy ratio (CBR);
- determine one or more channel resource utilization limits based on the CBR, wherein each channel resource utilization limit of the one or more channel resource utilization limits corresponds to a respective packet priority, the channel resource utilization limit being a function of a CBR limit and a number of other UEs within a communication range of a UE; and
- control transmission of a plurality of packets based on the one or more channel resource utilization limits, each packet of the plurality of packets having a packet priority.

* * * * *